US012792371B2

(12) United States Patent
Kusch et al.

(10) Patent No.: US 12,792,371 B2
(45) Date of Patent: Nov. 10, 2026

(54) ASSISTANCE LAYER TEMPLATES

(71) Applicant: WalkMe Ltd., Tel Aviv (IL)

(72) Inventors: KJ Kusch, St. Clair Shores, MI (US); Mathew Agnew-Brackett, San Francisco, CA (US); Peter Caldwell, Charleston, SC (US); Jeff Heller, New York, NY (US)

(73) Assignee: WalkMe Ltd., Tel Aviv (IL)

( * ) Notice: Subject to any disclaimer, the term of this patent is extended or adjusted under 35 U.S.C. 154(b) by 236 days.

(21) Appl. No.: 18/672,955

(22) Filed: May 23, 2024

(65) Prior Publication Data

US 2024/0394080 A1 Nov. 28, 2024

Related U.S. Application Data

(60) Provisional application No. 63/468,630, filed on May 24, 2023.

(51) Int. Cl.
*G06F 9/451* (2018.01)

(52) U.S. Cl.
CPC .................................... *G06F 9/453* (2018.02)

(58) Field of Classification Search
CPC ........................................................ G06F 9/453
See application file for complete search history.

(56) References Cited

U.S. PATENT DOCUMENTS

| | | | | |
|---|---|---|---|---|
| 2004/0243611 | A1* | 12/2004 | Alexander | G06F 16/25 |
| 2007/0220429 | A1* | 9/2007 | Kureshy | G06F 9/453<br>715/708 |
| 2011/0307780 | A1* | 12/2011 | Harris | G06F 9/453<br>715/708 |
| 2016/0026724 | A1* | 1/2016 | Ramsey | G06Q 30/0241<br>345/633 |

* cited by examiner

*Primary Examiner* — Seth A Silverman
(74) *Attorney, Agent, or Firm* — Myers Wolin, LLC

(57) ABSTRACT

A method, system and product comprising: obtaining, at a central processing unit associated with a digital adoption platform, assistance layers configured to be augmented over digital tasks, the digital tasks executable by end devices over client applications, the assistance layers configured to assist end users of the end devices with performing the digital tasks over the client applications; generating, based on the assistance layers, template assistance layers configured to assist clients of the digital adoption platform with generating new assistance layers, the new assistance layers are intended to assist the end users with performing the digital tasks; and adjusting an editor of the digital adoption platform to comprise the template assistance layers, thereby obtaining an adjusted editor; and distributing the adjusted editor to the clients.

17 Claims, 15 Drawing Sheets

ASSISTANCE LAYER TEMPLATES

CROSS-REFERENCE TO RELATED APPLICATION

This application is a non-provisional of and claims the benefit of U.S. Provisional Application No. 63/468,630 filed May 24, 2023, entitled "DIGITAL ADOPTION PLATFORM TEMPLATES", which is hereby incorporated by reference in its entirety without giving rise to disavowment.

TECHNICAL FIELD

The present disclosure relates to digital adaptation platforms in general, and to generating templates of assistance layers for digital adaptation platforms, in particular.

BACKGROUND digital adoption platforms represent a transformative category of software solutions designed to address the growing complexity of digital environments within organizations. At their core, digital adoption platforms aim to enhance user adoption and proficiency across various digital tools and platforms, ranging from enterprise software applications to web-based interfaces and mobile applications. Digital Adoption platforms recognize the crucial role that user experience plays in the success of digital initiatives, acknowledging that even the most robust software solutions can fall short if users struggle to navigate or utilize them effectively.

One prominent example of a digital adoption platform is DAP™ by WalkMe™, a leading solution in the field. WalkMe™ provides organizations with a comprehensive toolkit to create interactive on-screen guidance and support for users as they interact with different software applications. Through the use of contextual prompts, step-by-step walkthroughs, and real-time assistance, WalkMe™ empowers users to navigate complex workflows, learn new features, and maximize the value of the software they use. By overlaying intuitive guidance directly onto the user interface, WalkMe™ reduces reliance on external training resources, accelerates user onboarding, and minimizes user errors, ultimately driving higher levels of productivity and satisfaction within organizations.

BRIEF SUMMARY

One exemplary embodiment of the disclosed subject matter is a method to be implemented at a central processing unit associated with a digital adoption platform, the method comprising: obtaining a plurality of assistance layers that are configured to be augmented over digital tasks, wherein the digital tasks are executable by end devices over client applications, wherein the plurality of assistance layers is configured to assist end users of the end devices with performing the digital tasks over the client applications; generating, based on the plurality of assistance layers, a plurality of template assistance layers, the plurality of template assistance layers are configured to assist clients of the digital adoption platform with generating new assistance layers, wherein the new assistance layers are intended to assist the end users with performing the digital tasks; and adjusting an editor of the digital adoption platform to comprise the plurality of template assistance layers, thereby obtaining an adjusted editor; and distributing the adjusted editor to the clients.

Optionally, the method further comprises: subsequently to said obtaining, accumulating new assistance layers deployed over the digital tasks; generating, based on the new assistance layers, a new template assistance layer that is excluded from the plurality of template assistance layers; and dynamically adjusting the editor to comprise the new template assistance layer.

Optionally, the method further comprises: subsequently to said obtaining, accumulating new assistance layers deployed over the digital tasks; dynamically adjusting, based on the new assistance layers, a template assistance layer from the plurality of template assistance layers, thereby obtaining an adjusted template assistance layer; and dynamically adjusting the editor to comprise the adjusted template assistance layer.

Optionally, the method further comprises: grouping the plurality of assistance layers into respective digital task categories, business process categories, and process domain categories, wherein the digital task categories, business process categories, and process domain categories are technology-agnostic and not associated to the client applications.

Optionally, said grouping the plurality of assistance layers is performed based on one or more business process mining tools.

Optionally, the plurality of assistance layers is defined via the editor of the digital adoption platform by the clients of the digital adoption platform.

Optionally, at least a portion of the plurality of assistance layers is generated by the clients of the digital adoption platform without utilizing any previous template assistance layer available at the editor.

Optionally, at least a portion of the plurality of assistance layers is generated by the clients of the digital adoption platform based on a previous template assistance layer that was available at the editor before said distributing.

Optionally, the method further comprises: enabling the clients of the digital adoption platform to edit the plurality of template assistance layers via client devices.

Optionally, the method further comprises: generating, for a digital task, a first template assistance layer in a first maturity level, and a second template assistance layer in a second maturity level, wherein the first and second template assistance layers are configured to assist the end users with performing the digital task, wherein the first template assistance layer comprises less digital adoption platform building components than the second template assistance layer.

Optionally, all digital adoption platform building components of the first template assistance layer are comprised within the second template assistance layer.

Optionally, the method further comprises: accumulating statistical data regarding executions of the digital tasks together with the first and second template assistance layers, and determining, based on the statistical data, an effect of a maturity level on the executions of the digital task.

Optionally, the method further comprises: accumulating statistical data regarding executions of the digital tasks over the end devices before and after said adjusting, and determining, based on the statistical data, an effect of said adjusting on the executions of the digital task.

Optionally, said obtaining the plurality of assistance layers comprises obtaining data from at least one of: the end devices, and client devices of the clients of the digital adoption platform.

Optionally, the method further comprises: storing the plurality of assistance layers in a dataset, and periodically adjusting the dataset based on new crowdsourced data from said obtaining.

Optionally, said generating the plurality of template assistance layers is performed based on one or more techniques selected from: clustering techniques, data analysis tools, abstraction techniques, and machine learning algorithms.

Another exemplary embodiment of the disclosed subject matter is a computer program product comprising a non-transitory computer readable medium retaining program instructions, which program instructions when read by a processor, cause the processor associated with a digital adoption platform to perform a method, the method comprising: the method comprising: obtaining a plurality of assistance layers that are configured to be augmented over digital tasks, wherein the digital tasks are executable by end devices over client applications, wherein the plurality of assistance layers is configured to assist end users of the end devices with performing the digital tasks over the client applications; generating, based on the plurality of assistance layers, a plurality of template assistance layers, the plurality of template assistance layers are configured to assist clients of the digital adoption platform with generating new assistance layers, wherein the new assistance layers are intended to assist the end users with performing the digital tasks; and adjusting an editor of the digital adoption platform to comprise the plurality of template assistance layers, thereby obtaining an adjusted editor; and distributing the adjusted editor to the clients.

Yet another exemplary embodiment of the disclosed subject matter is an apparatus comprising a processor and coupled memory, the processor associated with a digital adoption platform, said processor being adapted to perform: obtaining a plurality of assistance layers that are configured to be augmented over digital tasks, wherein the digital tasks are executable by end devices over client applications, wherein the plurality of assistance layers is configured to assist end users of the end devices with performing the digital tasks over the client applications; generating, based on the plurality of assistance layers, a plurality of template assistance layers, the plurality of template assistance layers are configured to assist clients of the digital adoption platform with generating new assistance layers, wherein the new assistance layers are intended to assist the end users with performing the digital tasks; and adjusting an editor of the digital adoption platform to comprise the plurality of template assistance layers, thereby obtaining an adjusted editor; and distributing the adjusted editor to the clients.

Yet another exemplary embodiment of the disclosed subject matter is a system comprising a processor and coupled memory, the processor associated with a digital adoption platform, said processor being adapted to perform: obtaining a plurality of assistance layers that are configured to be augmented over digital tasks, wherein the digital tasks are executable by end devices over client applications, wherein the plurality of assistance layers is configured to assist end users of the end devices with performing the digital tasks over the client applications; generating, based on the plurality of assistance layers, a plurality of template assistance layers, the plurality of template assistance layers are configured to assist clients of the digital adoption platform with generating new assistance layers, wherein the new assistance layers are intended to assist the end users with performing the digital tasks; and adjusting an editor of the digital adoption platform to comprise the plurality of template assistance layers, thereby obtaining an adjusted editor; and distributing the adjusted editor to the clients.

One exemplary embodiment of the disclosed subject matter is a method to be implemented at a client device of an administrator user, the method comprising: executing an editor of a digital adoption platform on the client device, wherein the digital adoption platform is configured to assist the administrator user with generating an assistance layer over a digital task of a business process, wherein the business process belongs to a business domain, wherein the editor presents via a user interface a list of a plurality of business domains, wherein the plurality of business domains is agnostic to an environment of the digital task; selecting, via the user interface of the editor, the business domain from the list of the plurality of business domains, thereby being presented by the user interface of the editor with a list of a plurality of business processes within the business domain; selecting, via the user interface of the editor, the business process from the list of the plurality of business processes, thereby being presented by the user interface of the editor with a list of a plurality of digital tasks associated with the business process, wherein the digital tasks implement at least in part the business process, wherein the plurality of business processes, the plurality of business domains, and the plurality of digital tasks are agnostic to the environment of execution of the digital task; selecting, via the user interface of the editor, the digital task from the list of the plurality of digital tasks, thereby being presented by the user interface of the editor with a list of a plurality of templates of assistance layers for being executed over the plurality of digital tasks; selecting, via the user interface of the editor, a template from the plurality of templates of assistance layers, wherein the template is environment-specific; and enabling a plurality of end devices to execute the template over the environment of the digital task.

Optionally, the environment of the digital task comprises at least one of: a software application over which the digital task is configured to be performed, and a language of the at least one software application.

Optionally, the environment of the digital task comprises at least two software applications over which the digital task is configured to be performed.

Optionally, said enabling comprises providing the template to the plurality of end devices, wherein a plurality of end users utilizes the plurality of end devices for performing the digital task.

Optionally, the method further comprises: editing the template according to configurations of the environment of the digital task.

Optionally, the method further comprises: customizing the template according to preferences of a client associated with the administrator user.

Another exemplary embodiment of the disclosed subject matter is an apparatus comprising a processor and coupled memory, said processor being adapted to perform at a client device of an administrator user: executing an editor of a digital adoption platform on the client device, wherein the digital adoption platform is configured to assist the administrator user with generating an assistance layer over a digital task of a business process, wherein the business process belongs to a business domain, wherein the editor presents via a user interface a list of a plurality of business domains, wherein the plurality of business domains is agnostic to an environment of the digital task; selecting, via the user interface of the editor, the business domain from the list of the plurality of business domains, thereby being presented by the user interface of the editor with a list of a plurality of business processes within the business domain; selecting, via the user interface of the editor, the business process from the list of the plurality of business processes, thereby being presented by the user interface of the editor with a list of a plurality of digital tasks associated with the business process, wherein the digital tasks implement at least in part the business process, wherein the plurality of business processes, the plurality of business domains, and the plurality of digital tasks are agnostic to the environment of execution of the digital task; selecting, via the user interface of the editor, the digital task from the list of the plurality of digital tasks, thereby being presented by the user interface of the editor with a list of a plurality of templates of assistance layers for being executed over the plurality of digital tasks; selecting, via the user interface of the editor, a template from the plurality of templates of assistance layers, wherein the template is environment-specific; and enabling a plurality of end devices to execute the template over the environment of the digital task.

Yet another exemplary embodiment of the disclosed subject matter is a computer program product comprising a non-transitory computer readable medium retaining program instructions, which program instructions when read by a processor, cause the processor to perform a method at a client device of an administrator user, the method comprising executing an editor of a digital adoption platform on the client device, wherein the digital adoption platform is configured to assist the administrator user with generating an assistance layer over a digital task of a business process, wherein the business process belongs to a business domain, wherein the editor presents via a user interface a list of a plurality of business domains, wherein the plurality of business domains is agnostic to an environment of the digital task; selecting, via the user interface of the editor, the business domain from the list of the plurality of business domains, thereby being presented by the user interface of the editor with a list of a plurality of business processes within the business domain; selecting, via the user interface of the editor, the business process from the list of the plurality of business processes, thereby being presented by the user interface of the editor with a list of a plurality of digital tasks associated with the business process, wherein the digital tasks implement at least in part the business process, wherein the plurality of business processes, the plurality of business domains, and the plurality of digital tasks are agnostic to the environment of execution of the digital task; selecting, via the user interface of the editor, the digital task from the list of the plurality of digital tasks, thereby being presented by the user interface of the editor with a list of a plurality of templates of assistance layers for being executed over the plurality of digital tasks; selecting, via the user interface of the editor, a template from the plurality of templates of assistance layers, wherein the template is environment-specific; and enabling a plurality of end devices to execute the template over the environment of the digital task.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
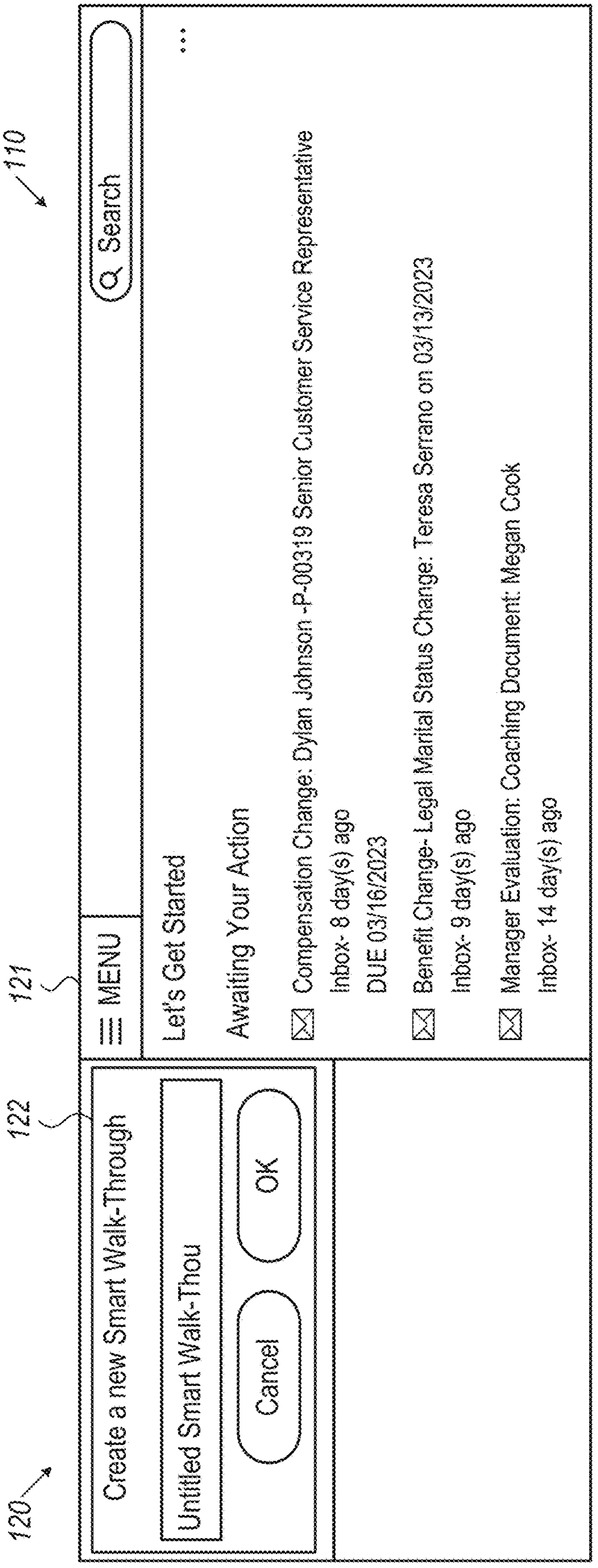
FIGS. 1A-1E illustrate an exemplary generation of an assistance layer, in accordance with some exemplary embodiments of the disclosed subject matter.

One technical problem dealt with by the disclosed subject matter is enhancing a process of generating assistance layers. In some exemplary embodiments, assistance layers, also referred to as 'augmentation layers', or 'walkthrough layers', may be designed for assisting users in digital tasks. In some exemplary embodiments, digital tasks may comprise actions or operations that users perform using digital mediums, devices or platforms. In some exemplary embodiments, digital tasks may be performed via a digital platform, such as a software application, a desktop application, a web-based application, an operating system, a Software as a Service (SaaS) application, a combination thereof, or the like.

In some exemplary embodiments, digital tasks may vary in complexity and purpose, encompassing a broad spectrum of actions conducted in the digital realm. In some cases, performing digital tasks may encompass several operations, such as navigating a website, clicking on links, accessing different pages, using search functionalities, or the like. For example, a digital task may comprise creating digital content such as documents, presentations, images, videos, or the like, editing digital content, filling out text fields, submitting personal information, communicating with other instances or systems, communicating with other users using digital infrastructure, extracting data, executing software applications, a combination thereof, or the like. In some cases, a 'cross-domain digital task' may refer to performing a digital task that encompasses executing operations over two or more digital systems, applications, pages, browser tabs, or the like.

In some exemplary embodiments, one or more entities, organizations, companies, or the like, referred to as clients, may aim to enable users to perform various digital tasks through its client applications, e.g., through its website platform. In some exemplary embodiments, a client may refer to an organization, company, or the like, that may employ or utilize one or more client applications, e.g., websites, desktop applications, web-based application, native mobile applications, or the like. In some exemplary embodiments, client applications, also referred to as third-party systems, may comprise proprietary and/or third-party applications over which digital tasks are intended to be executed, and may comprise any software products, applications, or websites. For example, a bank constituting a client may enable end users to perform banking-related digital tasks through its client applications, e.g., a proprietary website of the bank for its customers, third-party SaaS solutions such as a Human Resources (HR) platform for its employees, or the like.

In some exemplary embodiments, a client may employ client applications such as software applications, SaaS solutions of the client, third-party SaaS solutions that are employed by the client, or the like. In some exemplary embodiments, client applications may be employed by a client, utilized by the client, owned by the client, developed by the client, licensed to the client, or the like, such that the client may have access thereto and may be enabled to perform digital tasks over the client applications. In some exemplary embodiments, client applications may comprise one or more GUIs, each including a screen, a form, a web document, a page, an ANDROID™ layout, an iOS™ playground object, or the like, which may comprise a plurality of GUI elements. In some exemplary embodiments, a GUI element in a GUI may be a button, a label, a tooltip, a widget, an input field, a text box, or the like. In some exemplary embodiments, digital tasks may be designed to be performed over specified GUI elements in one or more GUIs of one or more client applications. For example, a digital task may be designed to be performed over the SALESFORCE™ application, an email application, the Microsoft™ Excel™ application, or any other software application or solution.

In some exemplary embodiments, in order to assist end users with completing digital tasks, clients may employ one or more assistance layers such as walkthroughs to aid end users (e.g., customers or employees of the bank in the above example) in navigating the client's website, navigating through the employed SaaS solutions, or the like. In some exemplary embodiments, assistance layers may be designed to assist end users with performing digital tasks efficiently, properly, successfully, in a timely manner, or the like.

In some exemplary embodiments, assistance layers may be generated using one or more platforms such as a digital adoption platform. For example, clients of a digital adoption platform may locally generate assistance layers according to their needs, e.g., using the digital adoption platform. In some exemplary embodiments, a digital adoption platform may enable its users (e.g., clients) to generate an assistance layer that can be executed over client applications, in order to assist end users of the client applications with performing digital tasks. For example, an administrator (admin) user within an organization such as a bank may utilize a digital adoption platform to create an assistance layer designed to help end users navigate and engage with the organization's digital assets. In some exemplary embodiments, the assistance layers may be designed to facilitate and streamline the adoption and usage of digital tools, applications, and software systems within the organization. For example, the assistance layers may be generated using WalkMe™'s DAP™ or any other digital adoption platform, non-digital adoption platform, or the like.

It is noted that while the client applications may constitute third-party systems in relation to the digital adoption platform, they may not necessarily be classified as third-party systems from the perspective of the clients. For example, in the above example, the client applications utilized by the bank may comprise a proprietary website owned by the bank, which may be considered a third-party system solely in relation to the digital adoption platform, but not in relation to the client. In other cases, the client applications may be regarded as third-party systems both in relation to the digital adoption platform and in relation to the clients. For example, in the above example, the bank may utilize a third-party application such as the Microsoft™ Excel™, which may be considered a third-party system in relation to the digital adoption platform as well as to the bank.

In many cases, digital adoption platforms may constitute no-code platforms, enabling non-programmers (e.g., an admin) to define, using a simple user interface, automations, rules, widgets, walkthrough branches and elements, or the like. In some exemplary embodiments, in order to design and generate assistance layers, an administrator user may utilize digital adoption platform building blocks, which may be no-code pre-configured building blocks available in the digital adoption platform. In some exemplary embodiments, a user may generate an assistance layer by selecting one or more types of digital adoption platform building blocks, defined positions for each digital adoption platform building block over the GUIs of the client applications, or the like. For example, an administrator user of a client may design and generate the assistance layer over the SALESFORCE® application, alone or in combination with any other client application, in order to aid end users of the client with utilizing the SALESFORCE® application correctly and efficiently.

In some exemplary embodiments, assistance layers may be generated using digital adoption platform building blocks, rules, heuristics, conditions, branches, or the like. For example, a rule may define that upon acquiring a specified element in the GUI, a walkthrough step should be presented over the GUI, at a defined position. In some exemplary embodiments, via a digital adoption platform, an admin user of a client may be enabled to design interactive guidance, interactive walkthroughs, contextual assistance, personalized training, contextual prompts, or the like, configured to be presented to end users of the client application and to assist them with utilizing complex software interfaces and functionalities for completing digital tasks. In some exemplary embodiments, admin users may be enabled to generate an assistance layer that is configured to augment or add a walkthrough over a GUI of a third-party system, in order to assist end users of the third-party system with performing digital tasks. For example, admin users may define through the digital adoption platform a walkthrough that is executable over at least one third-party system, and the walkthrough may be distributed to end users of the client, e.g., as depicted in FIGS. 1A-1E.

In some exemplary embodiments, after an assistance layer is generated by a digital adoption platform, it may be executed or deployed over associated client applications. In some exemplary embodiments, an assistance layer may be implemented as a software unit, a software block, a SDK, or the like, e.g., a JavaScript™ code or any other type of code. For example, JavaScript™ code may be injected by the client to one or more pages of one or more client applications over which the assistance layer is designed to be executed. For example, a software unit may be injected into the page by a browser extension, by a desktop agent, or in any other way. In other cases, clients may distribute the implementation of assistance layers directly to their customers, such as in the form of executable files, dynamic libraries, static libraries, or the like.

In some exemplary embodiments, assistance layers may be executed, at end devices, over client applications that may comprise web-based client applications, desktop client applications, native or web mobile client applications, or the like. For example, web-based client applications may be executed over execution environments such as CHROME™ desktop client applications may be executed over execution environments such as WINDOWS™ or macOS™, mobile client applications may be executed over execution environments such ANDROID™ or a mobile browser, or the like. In other cases, client applications may be executed over a cross platform framework such as XAMARIN™ REACT NATIVE™, or the like.

In some exemplary embodiments, one or more properties of digital adoption platforms are described in U.S. Pat. No. 9,922,008, entitled "Calling-Scripts Based Tutorials", dated Mar. 20, 2018, U.S. Pat. No. 9,934,782, entitled "Automatic Performance Of User Interaction Operations On A Computing Device", dated Apr. 3, 2018, U.S. Pat. No. 10,819,664 "Chat-Based Application Interface For Automation", dated Oct. 27, 2020, U.S. Pat. No. 10,620,975, entitled "GUI Element Acquisition Using A Plurality Of Alternative Representations Of The GUI Element", dated Apr. 14, 2020, and U.S. Pat. No. 10,713,068, entitled "Acquisition Process Of GUI Elements Using User Input", dated Jul. 14, 2020, all of which are hereby incorporated by reference in their entirety for all purposes without giving rise to disavowment.

In some exemplary embodiments, a digital adoption platform may enable its clients to perform one or more statistical analyses, identify patterns of end user interactions with a digital asset, identify patterns of end user interactions with digital adoption platform components, identify patterns of end user interactions with assistance layers, identify patterns of implementing digital tasks, or the like. For example, based on statistical analyses of success rates of digital tasks performed by end users that are served a digital adoption platform-based walkthrough, admin users may extract insights useful for manually revising the walkthrough, enhancing portions thereof, or the like.

In some exemplary embodiments, the digital adoption platform may comprise an independent platform that is not necessarily, or not at all, dependent or related to any client-related digital assets, client applications, or the like. For example, the digital adoption platform may be used by administrator users of an organization with digital assets, while the digital adoption platform itself is separate from the digital assets, does not collaborate therewith, may not invoke Application Programming Interface (API) calls to the digital assets, may not have access to data of the digital assets, may not collaborate with a backend of the digital assets, or the like. For example, the digital assets may comprise third-party systems of a client of the digital adoption platform. In some cases, since the digital adoption platform may be separate from the digital assets, the assistance layer generated thereby may not necessarily have access to internal data of the digital assets, e.g., source code, timing parameters, captured events, or the like. In such cases, the digital adoption platform may utilize a GUI of end devices executing digital tasks, for acquiring GUI elements and executing the assistance layers based thereon.

Referring now to FIGS. 1A-1E illustrating a generation of an assistance layer, in accordance with some exemplary embodiments of the disclosed subject matter.

In some exemplary embodiments, as depicted in FIG. 1A, a digital adoption platform may be used in order to generate an assistance layer such as a walkthrough over one or more pages of one or more client applications. In some exemplary embodiments, an admin user of the client may design the assistance layer to aid end-users to complete digital tasks, learn new features, overcome obstacles, or the like. In some exemplary embodiments, an admin user may render a page over which he desires to execute at least a portion of the assistance layer, e.g., Page 110. For example, in case the client is a bank, Page 110 may comprise a page of the bank's website, or a SaaS solution utilizes by the bank, or the like.

In some exemplary embodiments, Page 110 may comprise a page of a client application. For example, Page 110 may correspond to a webpage served by a web browser, a page of a desktop application, or the like. In some exemplary embodiments, assistance layers such as walkthroughs may comprise walkthroughs that are limited to a single client application, cross-domain walkthroughs that guide the user through the use of several different client applications, or the like.

In some exemplary embodiments, in order to generate an assistance layer, the admin user may execute a digital adoption platform, causing Editor 120 to be rendered. For example, Editor 120 may server to the admin user a plurality of digital adoption platform building blocks for designing a walkthrough (or any other assistance layer) that can be executed over one or more pages, e.g., including Page 110. As depicted in FIG. 1A, Editor 120 may enable the admin user to generate a new walkthrough and to name the new walkthrough via Window Element 122. In some exemplary embodiments, a walkthrough may be a tutorial which, when executed, presents in a sequential manner descriptive elements relating to the GUI, such as disclosed in U.S. Pat. No. 9,922,008, titled "Calling Scripts Based Tutorials", which is hereby incorporated by reference in its entirety for all purposes without giving rise to disavowment. Descriptive elements may include instructions and/or examples of usage, and may be associated with respective GUI elements, such as with a specific HyperText Markup Language (HTML) object within a web document.

Figure 1B:
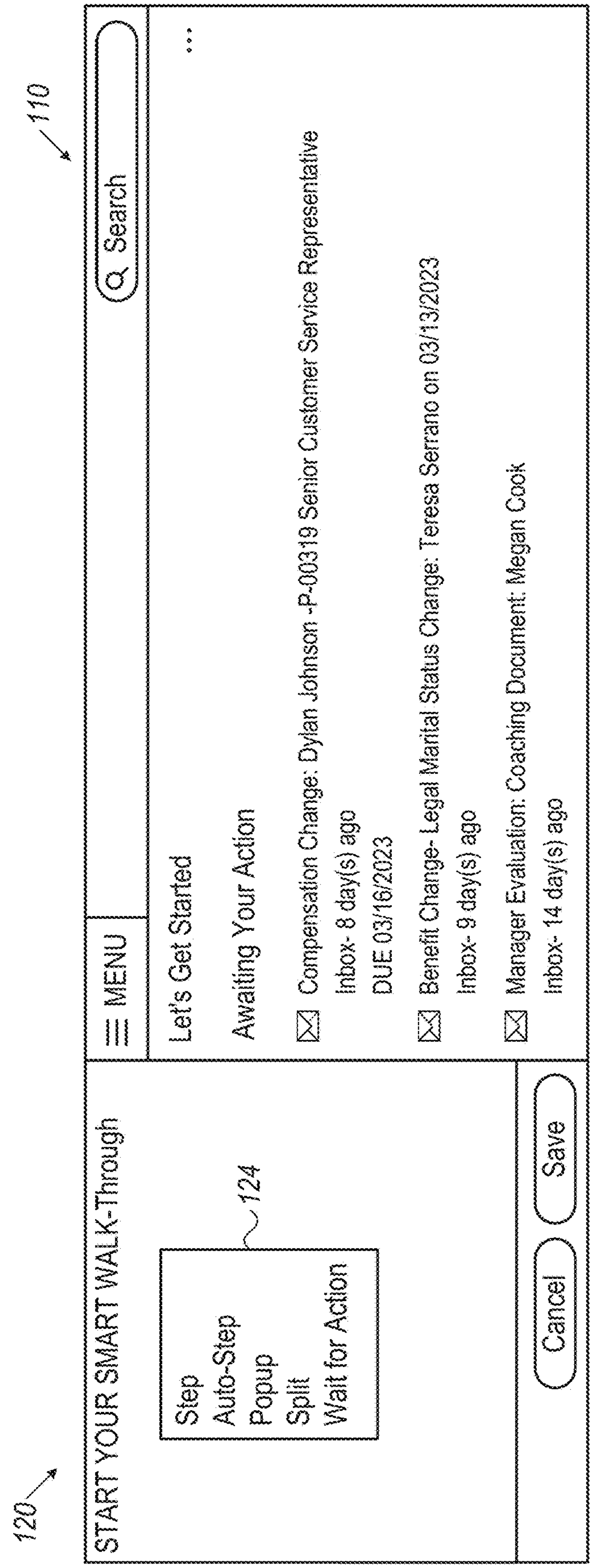

In some exemplary embodiments, after the admin user names the new walkthrough via Window Element 122, Editor 120 may present to the user a list of digital adoption platform building blocks, e.g., List 124 depicted in FIG. 1B. For example, List 124 may list widgets such as popups, tooltips, launcher widgets, steps, automatic steps, a waiting-for-an-event step, an action step, descriptive elements, or the like. In some exemplary embodiments, an element selected from List 124 may be used as a first element of the walkthrough. In some cases, List 124 may enable admin users to define a desired widget (e.g., a walkthrough element), define a behavior associated to the widget, define a sequence of one or more trigger events (with or without branch conditions) configured to invoke a behavior associated to the widget, or the like.

Figure 1C:
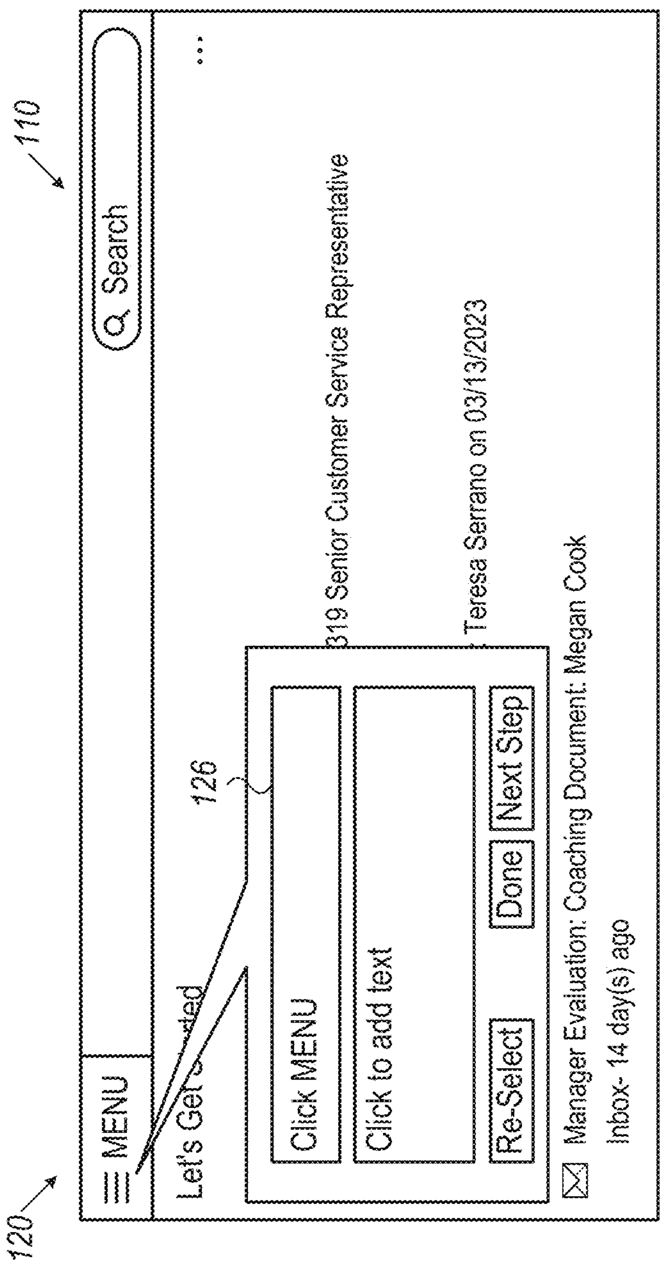
Figure 1D:
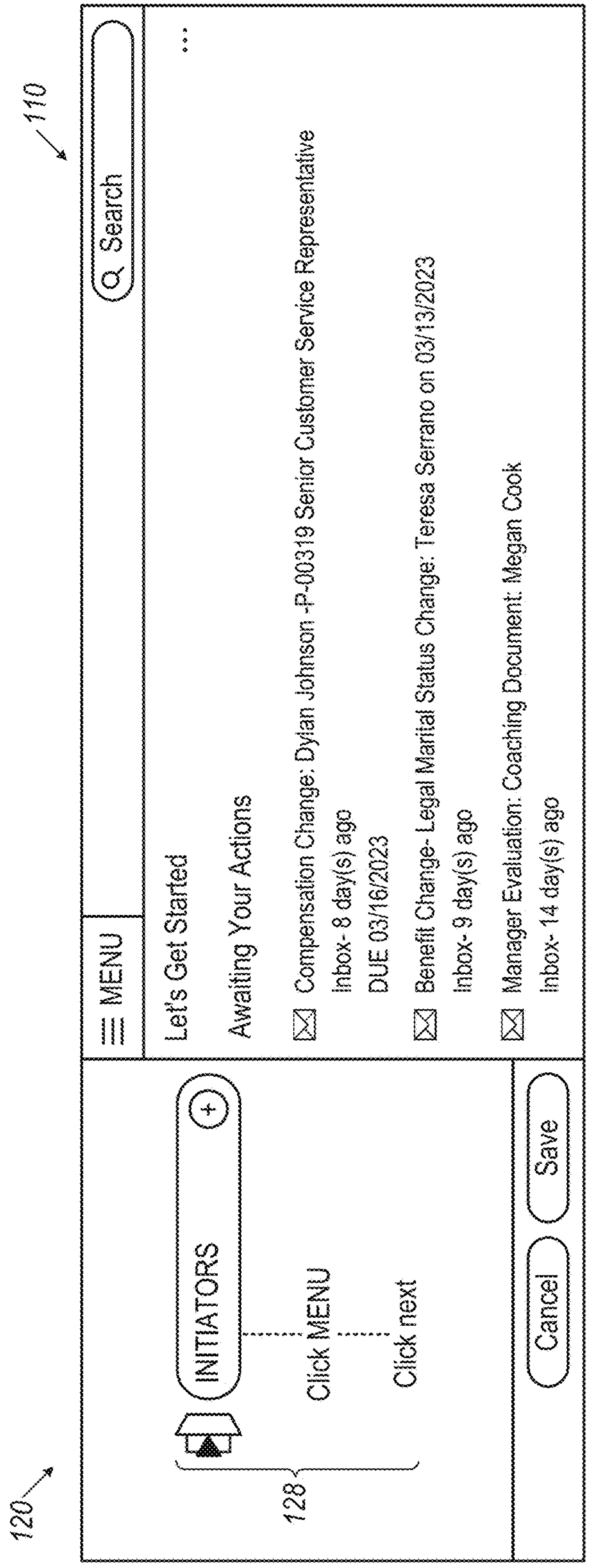

In some exemplary embodiments, FIG. 1C depicts that, after the admin user select a "step" option from List 124, the admin user may define the step as part of the walkthrough. For example, in case the step comprises selecting a GUI element such as Menu 121 (FIG. 1A), the admin user may demonstrate the step by selecting Menu 121, thereby causing a corresponding record of the step, e.g., Record 126, to be generated and stored.

In some exemplary embodiments, a plurality of elements may be selected from List 124, until an entire walkthrough is generated. For example, a walkthrough, such as Walkthrough 128 depicted in FIG. 1D, may be created based on selections of the admin user. In some exemplary embodiments, Walkthrough 128 may be created from a set of digital adoption platform building blocks in a defined order, e.g., a set of steps, popups, tooltips, launcher widgets, automatic steps, a waiting-for-an-event step, an action step, adding a descriptive element, or the like. In some cases, Walkthrough 128 may configure descriptive elements to be presented by widgets such as a launcher, a permanent link, an auto play, a tooltip, a button, a chat window, a balloon layout, or the like. In some cases, Walkthrough 128 may comprise a preconfigured walkthrough sequence, including a flow or sequence of steps of a walkthrough for performing a digital task. For example, Walkthrough 128 may be configured to present over the GUI a validation launcher or tooltip that is configured to, when selected by an end user, validate the value an end-user inputs into a text field of the GUI, e.g., indicating whether or not the input to the field complies with predefined rules. As another example, Walkthrough 128 may define to present over the GUI a, custom tooltips (or "ShoutOuts") that are configured to draw end-user's attention to a featured text or element, in order to assist end users with understanding an element's functionality or significance. As another example, Walkthrough 128 may define one or more tooltips configured to appear when an end user hovers their cursor over a specified element such as a button, icon, or link, and to provide supplementary information about the purpose or function of the associated element.

In some exemplary embodiments, Editor 120 may enable the admin user to generate an assistance layer such as Walkthrough 128 using a no-code platform, e.g., the digital adoption platform and its editor, without requiring the admin user to provide or amend coding at any stage.

Figure 1E:
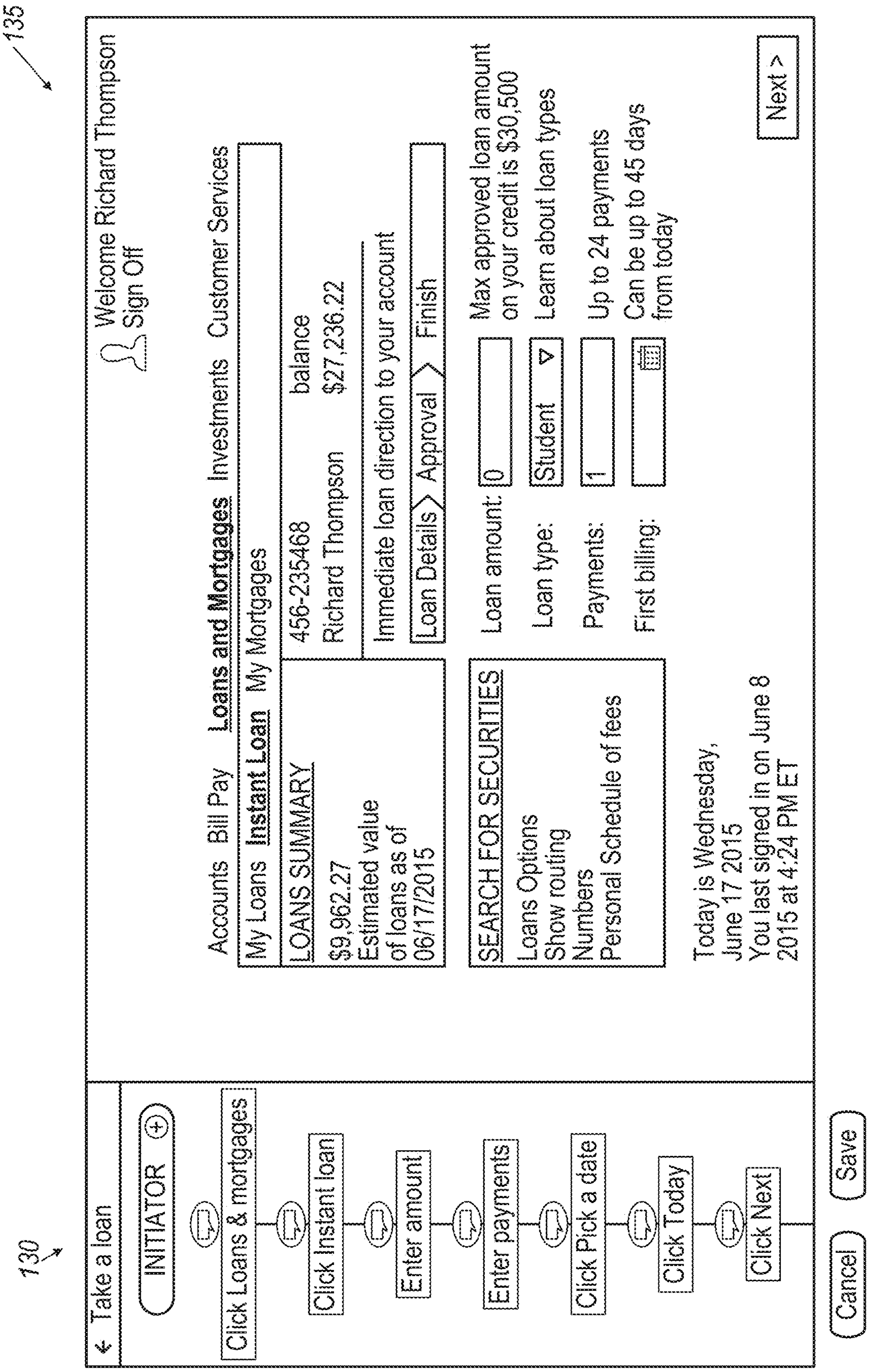

In some exemplary embodiments, FIG. 1E depicts an alternative walkthrough, e.g., Walkthrough 130, which may be generated by an admin user using the same digital adoption platform, using Editor 120, or the like. For example, Walkthrough 130 may be designed to be executed over a page of a client application, e.g., Page 135 of a banking application, and to apply thereon a preconfigured walkthrough sequence, including an exemplary flow or sequence of steps of a walkthrough for performing a digital task. For example, the digital task may comprise taking a quick loan from the bank.

In some exemplary embodiments, each step of Walkthrough 130 may relate to one or more GUI elements in Page 135. For example, Walkthrough 130 may guide end users by instructing them to select the tab "Loans and Mortgages", and then to select the tab "Instant Loan". In some exemplary embodiments, Walkthrough 130 may be configured to acquire, for each step, one or more corresponding GUI elements in the GUI, e.g., using an acquisition process. For example, Walkthrough 130 may acquire the tabs "Loans and Mortgages" and "Instant Loan", and present a tooltip adjacent thereto, instructing the user to select the above tabs in the defined order dictated by Walkthrough 130.

In some exemplary embodiments, upon completion of each step of Walkthrough 130, an advancement condition may be complied with, and a next step of Walkthrough 130 may be executed. For example, after the end user selects the tab "Loans and Mortgages", a first advancement condition may be complied with, causing a widget to appear and instruct the user to perform the next step, e.g., select the tab "Instant Loan". In some exemplary embodiments, at least one advancement condition of a walkthrough may be configured to be met by one or more actions of an end user that is interacting with the GUI of the client application. For example, as the end user follows the instructions of the walkthrough, a next step of a walkthrough may be configured to be invoked. As another example, advancement conditions may comprise a timeout, a user interaction, an automated user action, an external event, or the like. In some exemplary embodiments, in response to an advancement condition being complied with, Walkthrough 130 may define to add widgets over the GUI, to add descriptive elements to specified GUI elements, to modify properties of GUI elements, e.g., as part of the walkthrough or of any other assistance layer.

In some exemplary embodiments, in order to place descriptive elements near respective GUI elements, and identify that the respective GUI elements are present, Walkthrough 130 may be required to automatically acquire and identify the defined GUI elements. In some exemplary embodiments, acquisition of GUI elements may also be necessary, in some cases, for determining compliance with advancement conditions. In some exemplary embodiments, if the GUI element can be automatically identified within the GUI and referred to by automated means, the GUI element may be considered to be acquired.

In some exemplary embodiments, acquisition of GUI elements in third-party systems to which a digital adoption platform may not have access, may be challenging. In some exemplary embodiments, digital adoption platforms that have no direct data interface or access to the third-party systems may accumulate data from the third-party system in one or more indirect ways. In some exemplary embodiments, in order to acquire GUI elements, digital adoption platforms may monitor end user interactions with the third-party systems. In some exemplary embodiments, acquisition of GUI elements may be performed by monitoring the screen of user device rendering the GUI. For example, through the screen, the digital adoption platform may identify user interactions with the user interface and responses of the third-party system to the user interactions. In some exemplary embodiments, instead of directly communicating with the third-party system's backend, its source code, invoking API calls, or the like, the monitored data may be analyzed and utilized for indirect acquisition of GUI elements (e.g., for identifying compliance with the advancement conditions).

In some cases, GUI elements may be acquired according to one or more methods disclosed in U.S. Pat. No. 10,620,975, entitled "GUI Element Acquisition Using A Plurality Of Alternative Representations Of The GUI Element". In some exemplary embodiments, GUI elements may be acquired using one or more acquiring techniques, e.g., identifying the element based on parameters associated with the element, similarity scores, or any other acquisition process, e.g., over a plurality of user devices.

In some exemplary embodiments, in addition to enabling admin users to design walkthroughs such as Walkthroughs 128 and 130, Editor 120 may enable admin users to design non-walkthrough assistance layers such as tips that may be presented adjacently to GUI elements and provide corresponding tips to the user, GUI popups such as surveys asking the user for feedback and sending the feedback to a server, or the like.

In some exemplary embodiments, the process of generating assistance layers via a digital adoption platform may have one or more drawbacks. For example, the process may be labor intensive, time consuming, require high expertise in business processes and digital tasks, require cooperation between different teams, or the like. It may be desired to overcome these drawbacks, and enhance the process of generating assistance layers.

Another technical problem dealt with by the disclosed subject matter is automatically identifying digital tasks for which assistance layers are needed. In some exemplary embodiments, instead of relying on manual labor and human experts of each client to separately analyze statistical data and based thereon design assistance layers, it may be desired to reduce the reliance on manual labor and designs, and enable to identify failures of digital task completions, as well as their cause, automatically. For example, failures may encompass situations in which end users, while attempting to perform digital tasks, abandon the process, experience delays, encounter difficulties in completing the task properly, encounter a barrier at a particular step, or encounter similar challenges.

Yet another technical problem dealt with by the disclosed subject matter is automatically generating assistance layers. In some exemplary embodiments, it may be desired to generate assistance layers that are useful for assisting end users of clients, e.g., automatically, semi-automatically, or the like. For example, instead of relying on manual labor and human experts of each client to separately generate assistance layers for their digital tasks, it may be desired to reduce the reliance on manual labor and designs, and enable to generate assistance layers automatically.

Yet another technical problem dealt with by the disclosed subject matter is identifying and generating assistance layers that are beneficial for a plurality of clients using a respective plurality of client applications. For example, it may be desired to identify digital tasks for which assistance layers would be beneficial, that are common to a plurality of clients and client applications. In some cases, instead of specifically tailoring the identification process of digital process failures, and the generation of respective assistance layers, to a specific client that utilizes a set of client applications, it may be desired to identify issues in a cross-client cross-application manner, and generate therefore assistance layers that may be useful for a plurality of clients. For example, instead of identifying for a specific client (e.g., a bank) that a process such as taking a quick loan from the bank has low success rates and could benefit from an assistance layer, it may be desired to automatically generate an assistance layer for taking a quick loan that can be used for any entity that provides loans, regardless of the client applications used thereby, the GUI of each application, or the like.

One technical solution provided by the disclosed subject matter is generating assistance layer templates at a central entity such as at a digital adoption platform, and providing the templates to clients. In some exemplary embodiments, the assistance layer templates may be crowdsourced from assistance layers that were previously defined by clients (manually such as according to the method of FIGS. 1A-1E, or using previous templates), from digital tasks performed at client applications by end users, or the like. In some exemplary embodiments, the assistance layer templates may comprise prebuilt templates of assistance layers. In some exemplary embodiments, the assistance layer templates may be dynamically adjusted, revised, or the like, based on the crowdsourcing process, insights thereof, or the like.

In some exemplary embodiments, assistance layer templates may be useful since business process challenges are typically shared across various third-party systems, departments, and industries. For example, business processes may often rely on standardized business structures spanning multiple industries. In some exemplary embodiments, numerous industries, departments, and third-party systems may share comparable business structures and architectures, leading to comparable process challenges. For example, different business processes in different industries may share a common field in a form that is difficult for people to complete, and they may all benefit from an assistance layer aiding end users with completing the field.

In some exemplary embodiments, assistance layer templates, also referred to as 'digital adoption platform templates', may be added or made accessible to clients via an editor of the digital adoption platform. In some exemplary embodiments, the digital adoption platform that is distributed to clients may be adjusted to include the assistance layer templates, in addition to the core or basic digital adoption platform building blocks, e.g., the building blocks of FIGS. 1A-1E. For example, instead of providing clients with a digital adoption platform for manually creating assistance layers from scratch, e.g., using Editor 120 of FIGS. 1A-1D to generate each step and condition of an assistance layer, clients may be provided with a digital adoption platform in which the editor comprises a kit with assistance layer templates.

In some exemplary embodiments, each assistance layer template may comprise a plurality of steps, stages, configurations, conditions, or the like, and may be used by clients as a basis or a starting point for generating assistance layers. For example, assistance layer templates may comprise templates of walkthroughs that comprise a preconfigured walkthrough sequence, including a sequence of two or more steps of a walkthrough for performing a digital task. According to this example, the walkthrough template may be editable by each client. In some exemplary embodiments, clients may utilize the assistance layer templates as a starting point, and edit them according to their needs. In some exemplary embodiments, digital adoption platform templates may be edited by clients according to their specific organization goals, requirements, preferences, digital tasks, GUIs, or the like. For example, clients may utilize digital adoption platform templates as a starting point, and customize the templates according to their needs. In other cases, the template may be used by clients as is, e.g., without performing further adjustments. In some exemplary embodiments, the kit may reduce client efforts, save time, save human resources, or the like.

In some exemplary embodiments, assistance layers may be crowdsourced from end users of different clients, and used for an automatic template generation process of assistance layer templates. In some exemplary embodiments, since technical builders and developers may have limited insight into intricate processes, manual crafting of templates for shared cross-departmental business processes may be inefficient, suboptimal, or the like. In some exemplary embodiments, a manual template creation process may be time-consuming, involving iterative exchanges between technical builders and business experts, require extensive knowledge of each business process and digital tasks, or the like. In some cases, a manual template creation process may involve combining business architecture and technology to identify and address common structural elements across diverse industries. For example, a manual template creation process may comprise manually creating a template for specified form errors or inaccurate data entries leading users to abandon a business process. According to this example, such a process may require to first identify issues in one or more business processes, and then determine whether other business processes exhibit similar issues, e.g., as part of a bottom-up approach, and then determining which template of assistance layer can be applied to all the identified business processes. In some cases, a manual template creation process may have many drawbacks, e.g., it may be time- and effort-consuming on the client-side, may not take into account the end-to-end process from start to finish including its initiation phase, may require extensive knowledge of business processes in different client applications, may have limited scalability, may heavily depend on human expertise, may be at high risk of obtaining inconsistent results and errors, generated templates may not remain robust over time, may be difficult to update with new versions, may not adapt to changing business requirements or technological advancements, or the like.

In some exemplary embodiments, generating the assistance layer templates based on crowdsourced assistance layers, as performed by the disclosed subject matter, overcomes these challenges, and provides an automatic manner of identifying common structural elements across diverse industries in a time-conserving and resource-conserving manner. In some exemplary embodiments, crowdsourcing the assistance layer templates enables to gather data from a wide range of departments, levels of expertise, and roles within a client organization, thereby taking into account end-to-end business processes. For example, in case a field in a form is determined to be difficult for people to complete, and is found in different departments, a walkthrough generated by different clients of different departments for aiding users with filling the same field may be crowdsourced, and used to automatically generate a general walkthrough to assist users with filling out the field. In some exemplary embodiments, by pooling together the insights and experiences of diverse clients and their end users, crowdsourcing may uncover hidden inefficiencies or overlooked aspects of a business process that may be missed in a manual bottom-up approach.

In some exemplary embodiments, naïve bottom-up approaches may be replaced with a top-down approach, that flows from abstract business domains to technical task implementations and generates templates accordingly. In some exemplary embodiments, according to the top-down approach, digital adoption platform templates may be generated based on one or more levels of abstractions of digital tasks, e.g., from a top level of abstraction such as an industry or department, to a lowest level of abstraction such as a detailed digital task within a business process. In some cases, crowdsourced assistance layers may be processed and used for generating templates tailored for the digital tasks in the lowest level of abstraction, e.g., based on the determined levels of abstractions. For example, a highest level of abstraction of digital tasks may comprise a business domain (e.g., a department) of the digital task, a next level of abstraction may comprise a business process (also referred to as a ‘business workflow’), a next level of abstraction may comprise a specific task within the business process, or the like, and templates may be generated for assisting end users in the specific task. In other cases, digital tasks may be separated into any other levels of abstraction.

In some exemplary embodiments, the levels of abstractions may be determined manually, automatically, or the like. As an example, the levels of abstractions may be determined automatically by one or more business process mining tools such as American Productivity & Quality Center (APQC), which may be used to automatically separate business domains into buckets of business processes, sub-processes, or the like. For example, process mining tools may be used to group key processes in an organization hierarchically, e.g., using a Process Classification Framework (PCF). In other cases, any other tools, clustering techniques or classifiers may be used to determine the levels of abstractions.

In some exemplary embodiments, defining digital adoption platform templates according to determined levels of abstraction may enable to define templates for digital tasks that are agnostic to the various third-party systems over which the digital tasks can be implemented, to configurations, adaptors, or the like. For example, a business process may comprise an abstract category that may be defined for any industry or third-party system that utilizes the same business process over any pages, applications, browser tabs, or the like. In some exemplary embodiments, the lowest level of abstraction, e.g., the task level, may comprise a plurality of implementations of templates that implement the digital task in different third-party systems, client applications, languages, or the like. For example, a single template may implement a digital task in a single third-party system, in two or more similar third-party systems, or the like.

In some exemplary embodiments, crowdsourced data, including Business Intelligence (BI) data such as records of assistance layers that were defined by clients, records of digital tasks performed at client applications by end users, or the like, may be accumulated and stored in a database, repository, dataset, or the like. In some exemplary embodiments, the business process data may be accumulated over various industries, departments, third-party systems, or the like. In some exemplary embodiments, the crowdsourced data may be processed automatically, such as to classify processes to respective categories in different levels of abstraction, to identify commonly engaged processes, to identify common failures of digital tasks, or the like, e.g., using one or more process mining tools.

In some exemplary embodiments, based on the processing of the database, assistance layer templates may be generated and provided as a kit within a digital adoption platform that is deployed and launched at a plurality of clients. For example, the kit may be provided as an update to an existing digital adoption platform, as a new digital adoption platform, or the like. In some exemplary embodiments, the kit may be utilized by clients for generating assistance layers (e.g., walkthroughs) over one or more respective client applications. In some exemplary embodiments, in order to utilize the kit, clients may be served with a list of business domains, in addition to basic digital adoption platform building blocks that are provided by digital adoption platform editors (e.g., digital adoption platform building blocks listed in List 124 of FIG. 1B). In some exemplary embodiments, users, such as administrative users of a client, may select from the list a desired business domain, and funnel down the levels of abstraction until reaching a task level. In some exemplary embodiments, the admin user may select, for a desired task in the task level, a template that implements the task for one or more client applications, configurations of the client applications, in one or more languages, or the like. In some exemplary embodiments, admin users may be enabled to edit a selected template to match their specific business needs, e.g., in case an edit is desired.

In some exemplary embodiments, after assistance layer templates are deployed and executed by clients, records of the usage of the templates by clients may be further crowdsourced and stored in the database. For example, every template configuration that is selected by a client and downloaded to their editor may be crowdsourced. In some exemplary embodiments, the kit of assistance layer templates may be dynamically and iteratively refined based on accumulated business data, as part of a feedback loop. For example, in case a digital adoption platform template is adjusted in a same manner by a plurality of clients (e.g., to add an additional element), the template may be adjusted within the kit accordingly, thereby reducing client effort and saving time for clients. In some exemplary embodiments, dynamically adjusting the kit according to the feedback loop may ensure that templates accurately capture the entirety of the process and evolve over time to address changing needs, technologies, and circumstances.

It is noted that the disclosed subject matter is configured to be used by an entity (e.g., a company or any other central entity) that produces and distributes a digital adoption platform kit to clients, allowing the clients to utilize the digital adoption platform as a platform. Administrator users within the client organizations may employ the kit to create customized assistance layers for their own client systems, applications, or the like. End users of the client organizations that subsequently access client systems with deployed assistance layers will be assisted in performing respective business processes. The current solution is not intended for direct implementation by the clients or end users themselves; rather, it is implemented by a central entity that adapts or develops functionalities for digital adoption platforms, aiming to alleviate the burden, such as time, effort, and expertise, for the clients.

One technical effect of utilizing the disclosed subject matter is providing a kit of assistance layer templates that enables to reduce client efforts, save time, save human resources and efforts, or the like. In some exemplary embodiments, the assistance layer templates may comprise a preconfigured assistance layer, e.g., a walkthrough, that can be applied over a plurality of applications for assisting end users with a defined digital task.

Another technical effect of utilizing the disclosed subject matter is providing editable assistance layer templates that may be edited by clients according to their needs. In some exemplary embodiments, the assistance layer templates may function as a starting point for generating an assistance layer, instead of generating an assistance layer from scratch using basic digital adoption platform building blocks. In some exemplary embodiments, starting with an assistance layer template that corresponds to specific task of interest of a client, reduces an amount of time and effort of the client, enabling them to spend less time on technical configurations, while increasing a digital adoption capability for business processes.

In some exemplary embodiments, a kit of templates may be used as an advanced starting point even for clients that have never handled a process before, never used a digital adoption platform, or the like. Without such a kit, clients can create walkthroughs only by adding walkthrough steps manually, learning the business process thoroughly, determining an order of the execution of the steps, and the like. In contrast, the disclosed kit provides templates of automatically prepared walkthroughs that match a selected business process.

Yet another technical effect of utilizing the disclosed subject matter is performing efficient crowdsourcing that can identify that two tasks are identical even when implemented differently over different third-party applications, such as by classifying digital journeys of end users to a set of abstract categories of digital tasks. Rather than starting with identifying business process issues in a specific client application, attempting to fix the issues with one or more assistance layers manually generated by the client, and evaluating the success of the assistance layers, using a naïve bottom-up approach, the disclosed subject matter provides a top-to bottom crowdsourcing approach that starts with identifying business domains of journeys, bucket them to specific business processes, and then further bins them to a specific task within a business process. In some exemplary embodiments, this crowdsourcing approach enables to create templates that are defined according to abstract business needs, allowing to bucket or group together tasks from different domains, industries, or the like, and generate respective templates thereto. By crowdsourcing BI data according to abstract categories of digital tasks, the disclosed subject matter provides assistance layer templates for common cross-departmental business processes with configurations that are applicable for specific third-party applications.

In some exemplary embodiments, a digital journey of end users may be tracked through a business process even when the process covers multiple client applications. In some exemplary embodiments, a digital journey may refer to a series of interactions that a user experiences across digital platforms, systems, or channels while engaging with a resource, service, process, organization, tool, or the like, of one or more client applications. In some cases, digital journeys may be visualized by the digital adoption platform, processed thereby, binned thereby, or the like.

Yet another technical effect of utilizing the disclosed subject matter is enabling to automatically identify common issues within third-party systems, eliminating the need for manual intervention or human expertise. For example, by crowdsourcing BI data such as records of assistance layers that were defined by clients, records of digital tasks performed at client applications by end users, edits to previous templates, or the like, challenges that are common across different third-party systems may be identified automatically. In some exemplary embodiments, issues with business processes may comprise operations that have high failure rates, low adaption areas, or the like. In some exemplary embodiments, a digital journey of end users may be tracked through a business process even when the process covers multiple client applications, enabling to identify pain points and slowdowns.

Yet another technical effect of utilizing the disclosed subject matter is enabling to automatically generate assistance layer templates for digital tasks that can be tailored and executed across multiple industries, third-party systems, or the like. By crowdsourcing BI data, the disclosed subject matter provides pre-built, prescriptive assistance layer templates that are applicable for third-party systems. In some exemplary embodiments, the crowdsourcing process may ensure that the assistance layer templates are robust over time, adaptable, and capable of efficiently guiding users through diverse tasks across various client applications.

Yet another technical effect of utilizing the disclosed subject matter is enabling to automatically adjust templates according to accumulated BI data. This disclosed subject matter utilizes a feedback loop to adjust templates based on crowdsourced data, thereby ensuring robustness and up-to-date templates.

Yet another technical effect of utilizing the disclosed subject matter is providing insights regarding the efficiency of each template, maturity of the templates, potential adjustments that can optimize templates, or the like. In some exemplary embodiments, the insights may be extracted from interactions of end users with deployed templates that are deployed at different client applications, which may be automatically tracked and crowdsourced. In some cases, tracked BI data may be used to infer benchmarks for the value of adoption per use case.

In some exemplary embodiments, the insights may be inferred due to the crowdsourcing method used by the disclosed subject matter. In some exemplary embodiments, without grouping together templates of a same business process, domain, and task, clients would not be able to measure accurately maturity levels of deployed assistance layers, success rates of the assistance layer, correlations between these two metrics, or the like. In some exemplary embodiments, a performance of users may be benchmarked against other users in a same organization or industry, based on their tracked digital journeys (e.g., by visualizing and processing their journeys). In some exemplary embodiments, end-users' rankings against their team members or other organization may be visualized using a visualization tool, e.g., via heatmaps, charts, or the like. In some exemplary embodiments, ranking end users may be beneficial for managers, enabling them to gamify and measure employees' performances. In some exemplary embodiments, the insights may enable to advance digital maturity (e.g., indicating the degree of complexity, in-depth definition and control over the business processes), streamline processes for end-users, or the like.

It is noted that any exemplification of the disclosed subject matter as walkthroughs, is a mere exemplification, as the disclosed subject matter is not limited to walkthroughs or to walkthrough systems. As an example, the disclosed subject matter may be applied on any other assistance layer that is executed over any client application, any augmentation layer that can be augmented over any client application, or the like.

Figure 2A:
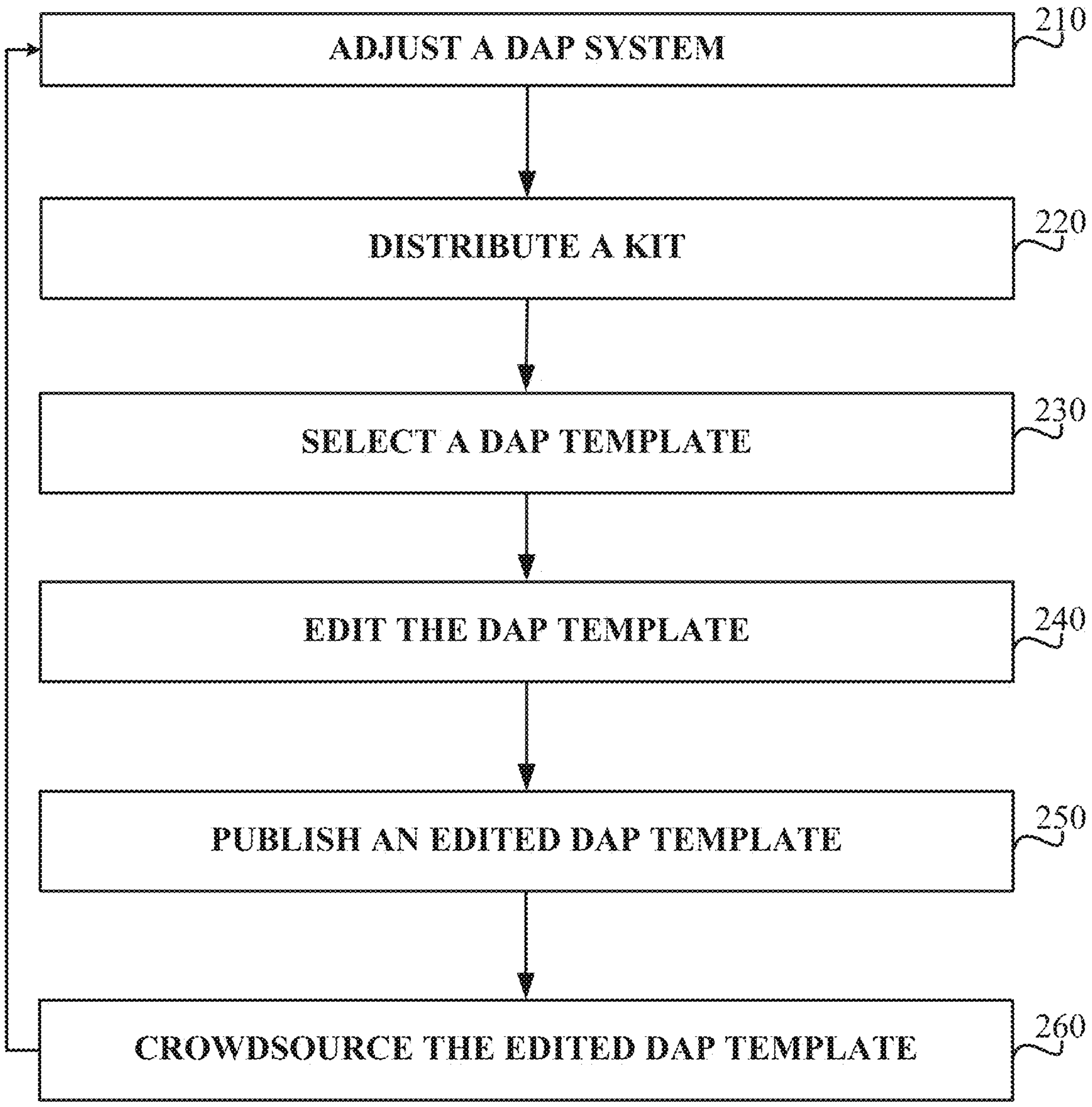
FIG. 2A depicts an exemplary flowchart diagram of a method, in accordance with some exemplary embodiments of the disclosed subject matter.

Referring now to FIG. 2A illustrating a flowchart diagram of a method, in accordance with some exemplary embodiments of the disclosed subject matter.

On Step 210, a digital adoption platform may be adjusted, programmed, or the like, to incorporate a kit with assistance layer templates. In some exemplary embodiments, assistance layers may be applicable to digital tasks of business processes that are associated to one or more business departments. In some exemplary embodiments, each assistance layer template may comprise a configuration or structure with a plurality of digital adoption platform building blocks. For example, the assistance layer template may be generated according to the method of FIG. 2B.

On Step 220, the adjusted digital adoption platform, or portion thereof, may be distributed to clients. For example, only the kit of assistance layer templates assistance layer templates may be distributed to clients, the entire digital adoption platform may be distributed to clients, or the like.

In some exemplary embodiments, the digital adoption platform may be deployed or accessible to a plurality of clients. For example, a copy of the digital adoption platform may deployed at a plurality of clients. In some exemplary embodiments, the kit may be distributed to the clients via version control systems such as Git™, through one or more package managers (e.g., after packing the kit as a library), through software distribution platforms such as GitHub™, through APIs or web services that clients can integrate into their existing digital adoption platform, through container registries like Docker Hub™ (e.g., after packing the kit as a Docker container), by manual installation, or the like.

On Step 230, clients may utilize the adjusted digital adoption platform for deploying assistance layer templates. For example, an admin user of a client may select a desired assistance layer template from the kit that was distributed to the digital adoption platform on Step 220. In some exemplary embodiments, instead of merely being presented with digital adoption platform building blocks within an editor console or page, such as with the digital adoption platform building blocks listed in List 124 of FIG. 1B, clients may be presented with various assistance layer templates that incorporate a plurality of digital adoption platform building blocks, conditions, configurations, or the like.

In some exemplary embodiments, an editor interface of a digital adoption platform may enable users (e.g., admins) to select a business domain of interest, to subsequently select a business process of interest therein, to subsequently select a template for generating an assistance layer for a digital task of interest therein, or the like. In other cases, any other levels of abstraction may be used to group or bin digital tasks, and admin users may navigate the editor accordingly.

In some exemplary embodiments, the editor page may be populated with the kit's templates, enabling users to launch the desired template upon selecting a template configuration (also referred to as a 'task accelerator') that matches their client applications, configurations, language, or the like. For example, after a user selects the business process, he may be presented with a set of templates (or task accelerators) for one or more digital tasks implementing the business process. According to this example, the different task accelerators of a digital task may match different platforms, applications, cross-applications, languages, client configurations, digital maturity levels, or the like. The user may select a task accelerator according to the configurations of the client applications that are related to the digital task, a desired timeframe or complexity for deploying an assistance layer for the digital task, or the like. For example, as the selected maturity level of the template is higher, it may require more time to customize and adapt to specific business requirements.

In some exemplary embodiments, the digital adoption platform may be configured to present, via a user interface, benchmark data associated with different templates, metadata thereof, statistical data thereof, or the like. For example, the benchmark data may comprise statistics metrics that are measured for the templates, such as usage rates, process improvement rates associated with the template, challenges or issues encountered in respective task, challenges or issues encountered in employment of the template, or the like. As another example, the digital adoption platform may present, for each digital task, a description of the digital task, challenges that the digital task faces, failures encountered by end users performing the digital task, or the like. In some cases, similar data may be provided for business processes, templates, or the like.

In some exemplary embodiments, after selecting a task accelerator, the admin user may be enabled to select one or more configurations of the task accelerator, and the task accelerator may be downloaded, deployed, or the like. For example, the assistance layer template may be deployed over the respective digital task, according to client configurations and client applications. In some cases, the assistance layer templates may be pre-downloaded within the editor, may be downloaded to the editor upon a user selection of a task accelerator, or the like.

On Step 240, clients may be enabled to edit the template, e.g., after the assistance layer template is selected, deployed, or the like. For example, an admin user may edit a template in case the assistance layer template does not exactly match the GUI of underlying client applications, in case the admin wishes to use different text in an augmented descriptive element, in case an acquisition process was unsuccessful with respect to one or more GUI elements, or the like. In some exemplary embodiments, edits may be performed by clients in order to personalize text of the descriptive elements, add one or more descriptive elements, change advancement conditions, change conditional branches, provide additional context within the walkthrough, provide additional personalization, present industry benchmarks, or the like.

In some exemplary embodiments, a template may be edited by adding features such as a launcher, a popup, a tooltip, a descriptive element of a walkthrough, automatic steps, a waiting-for-an-event step, an action step, a permanent link (permalink), an auto play, a button, a chat window, a balloon layout, a survey, a resource, a filter, a Standard Widget Toolkit (SWT), a shuttle (e.g., a smart link between different applications or pages), or any other widget or digital adoption platform building block. In some exemplary embodiments, the assistance layer template may be edited by changing locations of components, adding or removing components, changing conditions or rules, or the like.

In some exemplary embodiments, in case an acquisition process applied by the template (e.g., via the editor or a processor of the digital adoption platform) was unsuccessful in locating one or more GUI elements that are required for execution of the template, the admin user may edit the template configurations to map template steps associated with the GUI elements that were not found, to GUI elements in one or more client applications. For example, this may be performed in case that a task accelerator does not match at least one client application over which the digital task and template are executed, in case of a failure of the acquisition process, or the like. In some cases, template steps may be manually mapped to GUI elements in the client application using existing tools of the digital adoption platform editor, using designated tools, or the like.

In some exemplary embodiments, edits may be performed by clients in order to add user segmentations to templates. In some exemplary embodiments, admin users may incorporate role identification, geographical segmentations, or the like, causing the template to be presented to end users based on their user segment. For example, an admin user may define that certain templates may be presented only to end users located in defined geographical areas.

In other cases, edits may not be necessary, may not be performed, or the like, and Step 240 may be omitted. For example, a template may define a walkthrough that is executable over a login session and instructs end users how to complete a login operation. In case that the template is executable over the client's application, correctly identifies the GUI elements in the client's application, provides the desired descriptive elements, or the like, the client may choose not to perform any edits to the template.

On Step 250, after a template is ready to be used, e.g., after Step 230 or 240, the template may be published, executed, distributed to end devices of end users, or the like. For example, the template may be distributed from a client to end devices of the client's customers via version control systems, through one or more package managers, through software distribution platforms, through APIs or web services that clients can integrate into the client applications, through container registries, or the like. For example, the template may be embedded as JavaScript code within pages of the corresponding digital task (e.g., over one or more client applications). In some cases, the template may be distributed to end devices similar to Step 220.

On Step 260, BI data regarding interactions of end users with published templates, interactions and edits of clients with the templates before publishing, adjustments clients made to templates after they were published, or the like, may be crowdsourced and accumulated by a central entity such as the digital adoption platform. For example, a frontend software agent may be deployed at client devices, at end devices, or the like, and may monitor and report interactions of users, event logs, user sessions, defined assistance layers, or the like, to the central entity.

In some exemplary embodiments, the BI data may be stored at a backend of the central entity, stored at a cloud, stored at client devices (on premise) accessible to the central entity, stored at end devices accessible to the central entity, a combination thereof, or the like, e.g., within at least one database. In some exemplary embodiments, the BI data may be stored in association with a respective client, client application, or the like.

In some exemplary embodiments, the BI data may be processed, analyzed, or the like, such as to extract insights therefrom, to automatically estimate or measure quality metrics of templates, or the like. In some exemplary embodiments, the BI data may be processed to automatically identify client changes that were made to templates, indicating a quality or usefulness of the template to the clients. In some cases, in case a corpus of historic edits or adjustments of a plurality of clients is performed to a template, a low quality may be assigned to the template, and vice versa. For example, in case multiple clients have performed many changes to the template (e.g., more than a threshold number of changes of one or more types), the template may be determined to have a low quality, and vice versa.

In some exemplary embodiments, quality metrics may be defined based on a number of template changes, a number of template changes in one or more applications, a number of clients that performed template changes, a number of clients that deploy the template, a number of times the template is used by each client, modification patterns of templates, or the like. In some cases, User Interface (UI) Intelligence (UII) features may be incorporated within templates, assistance layers, or the like, and may report encountered issues to the respective client deploying the assistance layers, enabling the clients to streamline and enhance the workflows, the respective templates, or the like.

In some cases, as part of a feedback loop, templates may be automatically adjusted according to crowdsourced data of performed edits, measured quality metrics, or the like, such as in case that a cluster of similar edits to a template is identified. For example, same edits performed a certain number of times (exceeding a threshold) may be applied to the template, suggested to be automatically implemented by the template, or the like. In some exemplary embodiments, the template may be adjusted by providing a modified version of the template that incorporates an edit that was applied thereto by clients, by providing or suggesting an automation sequence mimicking interactions with the GUI that resulted with the identified edits, providing a notification that recommends to clients to implement the adjustments, or the like.

In some exemplary embodiments, the template may be adjusted within the kit, for currently deployed templates, or the like. For example, in case an edit to a template, which changes an old image in a descriptive element of a walkthrough with a new image, was performed a certain number of times, the digital adoption platform may suggest to another client that deploys the same template to replace the image accordingly. In some cases, the suggestion may be performed regardless of the underlying client application, e.g., even if the template edit was executed over a first client application and the other client executes the template over a second client application.

In some exemplary embodiments, the digital adoption platform may identify edits to templates, to common portions of different templates, or the like. For example, first and second templates may comprise a same component, such as a same step of updating a calendar. According to this example, in case one or more edits were performed by clients to the step of updating the calendar with respect to the first template (e.g., changing a format of a calendar update), the BI data may be analyzed to identify that the same step occurs in the second template. In such cases, the digital adoption platform may edit the template step of both templates, or suggest to clients that deploy the second template to perform the same edit. In some cases, edits may be suggested to other clients, to other users that belong to a same client organization, or the like.

Figure 2B:
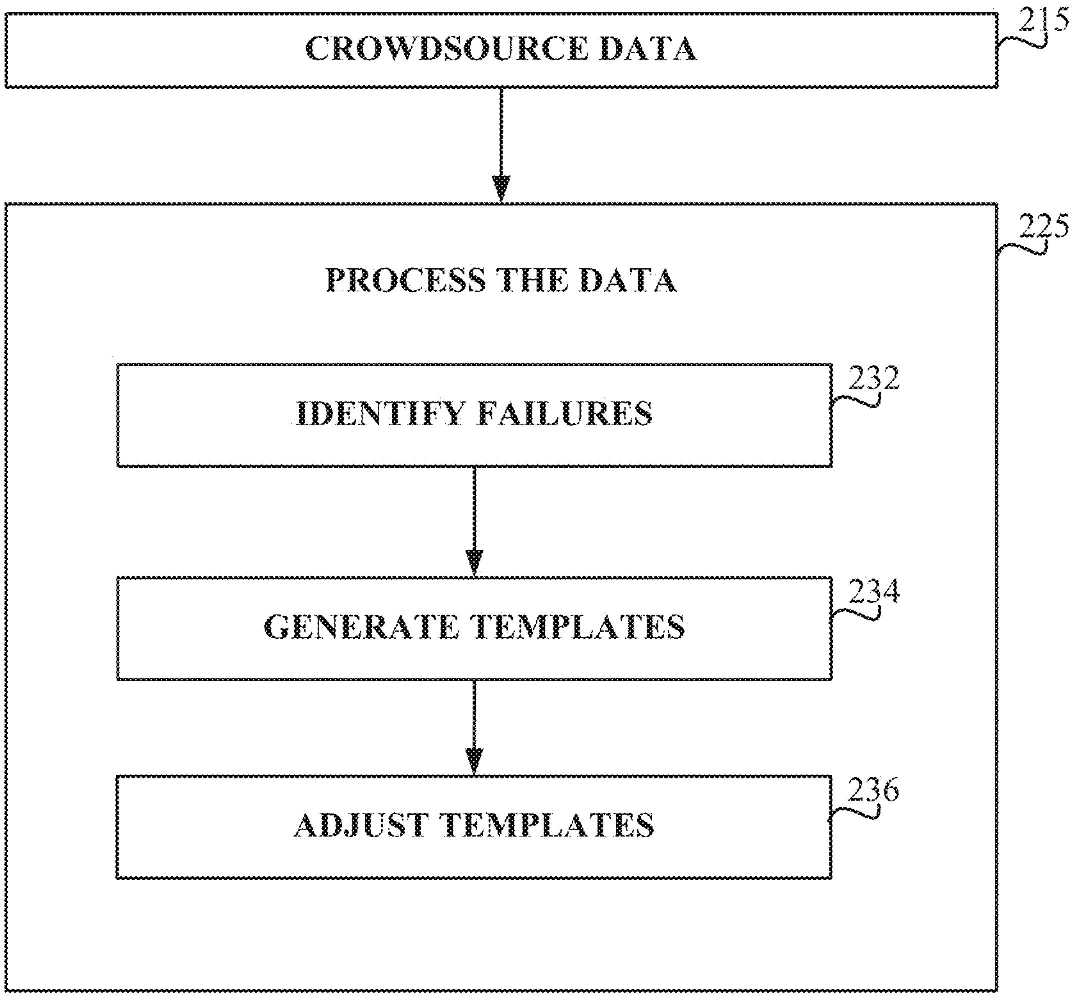
FIG. 2B depicts an exemplary flowchart diagram of a method, in accordance with some exemplary embodiments of the disclosed subject matter.

In some exemplary embodiments, the BI data may be processed to automatically generate new assistance layer templates, e.g., as part of Step 210, and according to FIG. 2B. For example, the BI data may be accumulated on Step 215 of FIG. 2B, and processed to generate templates on Step 225 of FIG. 2B.

In some exemplary embodiments, missing templates may be identified. For example, recorded interactions of clients with the editor of the digital adoption platform may indicate that the clients generated one or more assistance layers from scratch, although they have access to the kit of templates. In other cases, some clients may not have access to the kit, and all their assistance layers may be generated from scratch using digital adoption platform building blocks. In such cases, manually-generated assistance layers may be processed to determine whether or not a new template should be generated and added to the kit. For example, in case that a defined number of similar assistance layers, e.g., exceeding a threshold, were created by one or more clients for a task, a template may be generated based on the similar assistance layers. In other cases, new templates may be generated in any other way, e.g., based on reported names of desired tasks that are absent from the kit, which may be provided by clients such as via a Wishlist.

In some exemplary embodiments, Steps 210-260 may be implemented iteratively, periodically, or the like, and may constitute an automatic feedback loop. The automatic feedback loop may indicate failures of templates, suboptimal configurations of templates, failures of assistance layers, as well as environment changes such as changes in underlying client systems, technological developments, or the like.

Referring now to FIG. 2B illustrating a flowchart diagram of a method, in accordance with some exemplary embodiments of the disclosed subject matter.

In some exemplary embodiments, Step 210 of FIG. 2A may be implemented according to Steps 215-225 of FIG. 2B. For example, a digital adoption platform may be adjusted to incorporate a kit with assistance layer templates according to the steps of FIG. 2B.

On Step 215, BI data may be accumulated from clients, end users, or the like. For example, BI data may comprise assistance layers deployed by clients over client applications, records of interactions of end users with client applications, records of interactions of end users with assistance layers executed over client applications, records of interactions of clients with assistance layers, records of interactions of clients with digital adoption platform building blocks, adjustments to assistance layer templates in currently deployed assistance layers (if exist), or the like. In some exemplary embodiments, accumulated records may comprise event logs, user sessions, captured screen shots, captured screen representations, usage data of client applications, usage data of assistance layers, representations of assistance layers, representations of user interactions, or the like. In some exemplary embodiments, the BI data may be tracked across a plurality of client applications that are used by clients and their end users, e.g., HR applications, management applications, banking applications, or the like.

In some exemplary embodiments, the BI data may be crowdsourced, such as by monitoring real time interactions of clients and/or end users. In some exemplary embodiments, the BI data may be crowdsourced by automatically using a crawler, a script, a software, a browser extension, a mobile application, process mining tools, a web application, a Software Development Kit (SDK), a shared library, software products, bots, a Dynamic Link Library (DLL), or the like. In some cases, the BI data may be collected through manual crowdsourcing, where end users, clients, or similar parties explicitly provide the BI data via reports. In some cases, assistance layers may be estimated based on indirect data such as screenshots, logs, or the like, captured at client devices, and end user devices (e.g., customers of a client), or the like. In some exemplary embodiments, BI data may be accumulated in any other way, such as by obtaining the data from a remote server, obtaining the data from a third-party entity, or the like. In some exemplary embodiments, the BI data may or may not be anonymized, such as by removing Personally Identifiable Information (PII) therefrom, certain type of features, or the like.

In some exemplary embodiments, the BI data may be crowdsourced, such as by configuring a software agent executed at client devices to periodically report data regarding deployed assistance layers, components of deployed assistance layers, engagements of end users with deployed assistance layers, edits to deployed assistance layers over time performed by the clients, edits to assistance layer templates performed by the clients, interactions of end devices with the assistance layers and/or client applications as accumulated at the client devices, or the like. As another example, assistance layers generated by client devices may be directly submitted from the client devices to the digital adoption platform. In some exemplary embodiments, the BI data may be crowdsourced, such as by monitoring real time interactions of end users with end devices. For example, a software agent may monitor real-time interactions of end users with the front ends of deployed client applications (e.g., third-party systems) and with assistance layers executed over the client applications. The software agent may record these interactions and forwards the data records to a central entity, such as a backend of the digital adoption platform.

In some exemplary embodiments, the crowdsourced data may be stored, at the central entity, within a dataset, a database, a repository, or the like. In some exemplary embodiments, the dataset may be obtained, generated, created, or the like, e.g., automatically, semi-automatically, manually, or the like.

On Step 225, the crowdsourced data may be processed, analyzed, or the like. In some exemplary embodiments, the crowdsourced data may be processed to identify failures of business processes and/or digital tasks, to identify patterns of assistance layers that are used by clients and are not represented by templates of the digital adoption platform kit, to identify patterns of assistance layers that indicate adjustments that are beneficial for templates of the digital adoption platform kit, or the like. For example, the crowdsourced data may be processed according to Sub-Steps 232-236.

On Sub-Step 232, failures of business processes and/or digital tasks of client applications may be identified. In some exemplary embodiments, digital tasks, or digital journeys, of end users that are performed over client applications may be identified by aggregating, clustering, or the like, different data records from the accumulated crowdsourced data of Step 215. For example, the crowdsourced data may be clustered or grouped into journeys, sessions, or the like, based on timestamps of data records, domains of rendered pages, session keys, identifiers of users within a record or session, or the like. For example, the crowdsourced data may be clustered into user journeys using one or more tools such as Google Analytics™.

In some exemplary embodiments, digital journeys of users may implement one or more digital tasks over one or more client applications. In some exemplary embodiments, a digital journey may be implemented within a single application domain, over a plurality of different client applications, or the like. For example, a digital journey may be facilitated via a HR client application, an email application or website, a calculator application, a video conference application, a combination thereof, or the like.

In some exemplary embodiments, after grouping the crowdsourced data into digital journeys, identified journeys of users may be classified or binned into one or more categories in one or more levels of abstraction. For example, identified journeys may be classified into abstract categories such as business domains, business processes, and tasks. In some exemplary embodiments, a number of abstraction levels for the journeys may be selected, e.g., by process mining tools, manually, or the like. In some exemplary embodiments, the classification may be performed using one or more process mining tools. For example, one or more process mining tools may be used to identify what digital task is performed by each journey or portion thereof, to which business process it relates, to which industry the task pertains, or the like.

In some exemplary embodiments, process mining tools may classify recorded screens, logs, or sessions of users into corresponding bins of categories in different abstraction levels. For example, the crowdsourced data may be classified into business domains or company departments such as Sales, Human Resources (HR), Finance, Healthcare, Education, Banking, or the like. In some exemplary embodiments, after a journey or portion thereof is classified as corresponding to a certain digital task, success or failure metrics of the digital task may become measurable.

In some exemplary embodiments, BI data may be classified into abstract categories automatically, semi-automatically, manually, or the like. For example, a classifier such as a supervised or non-supervised deep learning module may be trained to classify records of BI data (e.g., journeys) into respective business domains. According to this example, the classifier may be trained based on a training set of recorded journeys of end users that are labeled with corresponding digital tasks. As another example, process mining tools may be used to classify journeys into respective business domains. As another example, a software agent may be configured to classify journeys into respective business domains based on computer vision extractions of text from recorded screens, and a mapping of the text extracted from journeys to a list of predefined client applications, business domains, industries, logos, or the like. For example, the mapping may be performed based on an internal knowledge base, a network search of the extracted text, a mapping of business names to domains, or the like. In some cases, instead of a mapping, or in addition thereto, a semantic analyzer may be used to assess the business domain of a journey (also referred to as a 'workflow') based on a sematic meaning of the text extracted from the journey (e.g., from screens thereof). In other cases, business domains may be estimated using any other technique or tool, e.g., image processing techniques, computer vision techniques, manually by business experts, data mining tools, business architecture processing tools, or the like.

In some exemplary embodiments, similarly to business domains, any other abstract category, e.g., business domains and digital tasks, with any other abstraction level may be similarly determined for journeys. For example, journeys may be classified into a consecutive lower level of abstraction, e.g., into business processes, business departments, or the like. As another example, journeys may be classified into a lowest level of abstraction, e.g., into digital tasks of each business process. In some exemplary embodiments, the classifications may be performed similarly to the classification of journeys to business domains.

It is noted that the binning of BI data such as journeys, workflows, and records into categories of different levels of abstraction may be performed in any order, e.g., from a low abstraction level to a high abstraction level, vice versa, in a random order, or the like.

In some cases, a dataset may store processed BI data in one or more manners, e.g., using one or more segregations, layers, levels, clusters, or the like. For example, the dataset may store within a first level (e.g., a parent folder, menu item, or link), categories of a highest abstraction level, e.g., business domains identified within the BI data. For example, the business domains may correspond to those of FIG. 3B, or to any other categories, abstraction level, or the like. In some cases, the database may store within a next level, sub-folder, or the like, such as within each business domain, categories of a subsequent abstraction level, e.g., business processes identified within the BI data. For example, the business processes may correspond to those of FIG. 3C, or to any other categories, abstraction level, or the like. In some cases, the database may store within a next level, sub-folder, or the like, such as within each business process, categories of a subsequent abstraction level, e.g., digital tasks identified within the BI data. For example, the digital tasks may correspond to those of FIGS. 3E and 3D, or to any other categories, abstraction level, or the like. In other cases, the dataset may be organized and stored in any other manner.

In some exemplary embodiments, the dataset may store, for each digital task, digital journeys of users that are associated with the digital task, digital journeys of users that implement at least a portion of the digital task, assistance layers of clients that are defined and/or deployed for the digital task, metadata indicating client applications over which the digital journeys are performed, or the like. In some cases, recorded journeys of end users, or portions thereof, may be assigned to a respective task that the journey is estimated to perform (at least in part). In some cases, a single journey may be associated to more than one digital task, resulting with the journey or portions thereof being stored in association with a plurality of digital tasks. In some cases, a journey may correspond to different classifications, e.g., to more than one business domain, more than one business process, more than one digital task, or the like. For example, a journey may incorporate a plurality of digital tasks associated with different business processes. In such cases, the journey may be split into different records associated with different digital task, and stored within the respective business processes, or the entire journey may be stored in association (e.g., via a tag or link) with different digital tasks within the respective business processes.

In some exemplary embodiments, digital journeys that are classified to belong to a same digital task may comprise different implementations of the same digital task. For example, for a digital task of recruiting an employee, a first digital journey may implement the digital task using a first process over a first application such as Oracle™, while a second digital journey may implement the digital task using a second process over a second application such as Salesforce™. According to such examples, in case assistance layers are deployed for both recruitment processes, the assistance layers may differ in their instructions, text, widgets, order, steps, or the like.

In some exemplary embodiments, digital journeys that are classified to belong to a same digital task may be analyzed, to determine a percentage of failures to implement the digital task by the journeys, steps of the digital task that have low success rates, or the like. UII features that are incorporated within templates, assistance layers, or the like, may be used to identify encountered issues with digital tasks.

In some exemplary embodiments, if a digital task is found to exhibit a notable percentage of failures (e.g., exceeding a threshold), a substantial count of failures (e.g., exceeding a threshold), demands considerable time investment from end users, or the like, the digital adoption platform may categorize the digital task as presenting an issue, a high failure rate, a challenging step for end users, or the like. In some exemplary embodiments, an identified issue may indicate that an assistance layer template for the digital task should be generated, that an assistance layer should be adjusted in case the digital process already deploys an assistance layer, or the like.

On Sub-Step 234, one or more templates of assistance layers may be generated. In some exemplary embodiments, templates may be generated based on identified failures of user journeys in implementing a digital task, based on identified digital tasks for which no templates of assistance layers exist, or the like, e.g., based on Sub-Step 232. For example, digital tasks that are found to exhibit a notable percentage of failures may be determined to have one or more issues, may be estimated to benefit from an assistance layer, its assistance layer (if exists) may be determined to be sub-optimal, or the like.

In some exemplary embodiments, digital journeys of a task may be automatically analyzed to identify the prevalence of different journeys or workflows within a task, a number of assistance layers deployed for the task, a number of engagements of end users with the assistance layers, or the like. In some exemplary embodiments, since a same task may be implementable in different manners by different end users, different journeys that implement the task in different ways may correspond to the task.

In some exemplary embodiments, templates may be generated for different journeys that are prevalent (e.g., their percentage or count with respect to other journeys of the same task exceeds a threshold). For example, journeys may be clustered or binned into different implementations of a digital task, and in case a number of journeys in at least one cluster is greater than a threshold, a template corresponding to the process of the cluster may be determined to be generated. As another example, in case a total number of journeys of a task is greater than a threshold, a template corresponding to the digital task may be determined to be generated. As another example, in case a number of assistance layers deployed by clients for the task is greater than a threshold, a template corresponding to the digital task may be determined to be generated.

In some exemplary embodiments, in case a template is determined to be generated for a task or a specific implementation of the task, assistance layers that were generated by clients for the digital journeys may be extracted and processed. In some cases, assistance layers that were executed for journeys that failed to perform the digital task, may be filtered out, scored a low priority score, or the like. In some cases, statistical metrics may be used to measure a prevalence of each step of the assistance layers, a prevalence of each order of steps, or the like, and to generate based thereon a generalized form of the assistance layers as a template. For example, key assistance layers that are more prevalent than a defined threshold may be used for generating a template. In some cases, this process may be combined with one or more rules, heuristics, or the like.

In some exemplary embodiments, assistance layers may be generalized and converted to a template in one or more manners, e.g., using one or more clustering techniques such as K-means or hierarchical clustering, classifiers such as decision trees and support vector machines, data analysis tools such as statistical methods, abstraction techniques, machine learning algorithms such as neural networks, rule-based systems, Large Language Models (LLMs), or the like. For example, the assistance layers may be analyzed to identify common patterns, sequences, similarities, and key elements shared across multiple assistance layers of different client applications. Through abstraction, specific details unique to individual platforms or applications may be generalized to a cross-application feature, and a template structure may be devised to encapsulate the essential components of the assistance layers. For example, feature extraction or dimensionality reduction may be used to perform abstraction of assistance layers into simplified representations while preserving essential information. As another example, machine learning algorithms such as supervised and unsupervised learning methods may be trained to facilitate the automatic identification of common patterns and sequences across multiple assistance layers. As another example, LLMs such as ChatGPT™ may be invoked and prompted to determine what digital tasks could benefit from additional templates, suggest adjustments for existing templates, or the like.

In some exemplary embodiments, in case implementations of a digital task differ substantially, such as in case clusters of assistance layers have a similarity score below a threshold, assistance layers of each cluster may be generalized to a respective template. In some exemplary embodiments, a resulting generalized template may be used as a reusable blueprint for guiding users through the digital task across various applications, enhancing usability, consistency, and efficiency of user interactions.

In some exemplary embodiments, in case assistance layers are not deployed for a task by any client, a template of an assistance layer may be generated for the task based on the journeys of end users. For example, successful journeys may be generalized and used to create a template of an assistance layer using a classifier, heuristics, or the like.

In some exemplary embodiments, tasks may be generated even in case the prevalence of journeys that implement the task, and/or corresponding assistance layers, is low. For example, in case a client explicitly prioritizes a task, or in case a task is prioritized automatically based on one or more defined rules, a template may be generated for the task regardless of the prevalence of journeys implementing the task.

In some exemplary embodiments, in addition to creating templates of assistance layers at the digital adoption platform, any other system with access to the digital adoption platform may be enabled to create its own templates, such as for internal use within an organization.

In some exemplary embodiments, the generated templates of assistance layers may comprise a composition of a plurality of digital adoption platform building blocks, conditions, automations, rules, widgets, walkthrough branches and elements, orders between elements, or the like. For example, a generated template may comprise a plurality of components of a walkthrough, including one or more descriptive elements, advancement conditions, or the like, which may be executed over a digital task, a portion thereof, or the like, over one or more client application. In some exemplary embodiments, a template of an assistance layer may be generated to comprise a sequence flow graph with action steps, logical steps such as a conditional branch steps, monitoring steps, timeout steps, goal steps, flag steps, AI-based steps, or the like. For example, a template may be generated to comprise a step that generates a prompt to a Large Language Model (LLM) such as ChatGPT™ and performs an action based on an output from the LLM.

In some exemplary embodiments, the generated templates of assistance layers may comprise environment-specific executable task accelerators that are executable over one or more specified client applications. In other cases, generated templates may not be environment-specific, and may be executable over different client applications, e.g., using an acquisition process to identify corresponding GUI element in each application.

On Sub-Step 236, one or more templates of assistance layers may be adjusted. In some exemplary embodiments, in case a template already exists for a digital task, the template may be determined to be adjusted based on newly accumulated BI data indicating issues with the template.

For example, in case Sub-Step 232 indicates that failures of performing the digital process are still high after deploying the template, or that failures did not become less prevalent, were not reduced to a desired rate, or the like, the template may be determined to be adjusted. As another example, in case the data crowdsourced on Step 215 indicates that a large number of adjustments were made to the template by clients, e.g., exceeding a threshold, the template may be determined to be adjusted. According to this example, edits to templates may be identified over different client applications, different languages, or the like. As another example, in case the data crowdsourced on Step 215 indicates that engagements of admin users of clients with the template are low, e.g., less than a threshold, the template may be determined to be adjusted or to be removed from the kit. As another example, in case the data crowdsourced on Step 215 indicates that a number of assistance layers that are deployed by clients and utilized the template is low, e.g., less than a threshold, the template may be determined to be adjusted or to be removed from the kit.

In some exemplary embodiments, removing a template from the kit may refer to deleting the template, deprecating the template, discarding the template, or the like. For example, after removing a template from the kit, all client devices may not have access to the template, updates of the digital adoption platform may cause the template to become inaccessible, or the like.

In one scenario, a digital task may comprise adding an employee record process, and two templates (or task accelerators) may define a walkthrough to the digital task in respective languages: English and Hebrew. A first client may select a first template, applying the walkthrough in its English version, and a second client may select a second template, applying the walkthrough in its Hebrew version over a same or different HR application. Both clients may then remove a same descriptive element from the walkthrough. In such cases, although the descriptive elements are written in different languages and belong to different templates of the digital task, the digital adoption platform may determine that the edits are identical, as they relate to the same walkthrough element. In such cases, the digital adoption platform may potentially adjust the template to remove the redundant descriptive element in all languages.

In another scenario, a template may comprise a walkthrough for performing a login process. At a certain point, the login technology may develop, such as by adding a third-party verification step to many client systems, causing the clients to add to their assistance layers instructions related to the third-party verification step. In such cases, the digital adoption platform may determine that a step of the template should be replaced with the instruction, or that a new step should be added to the template, thereby dynamically adjusting the template based on newly deployed technologies.

In some exemplary embodiments, Steps 210-260, as well as Steps 215-225, may be implemented iteratively, periodically, or the like, and may constitute an automatic feedback loop. For example, edits performed on Step 240 may be recorded and crowdsourced by the digital adoption platform's backend, where the edits may be processed to identify needed template adjustments. For example, in case multiple clients made a same change to text of a descriptive element of a template, the template may be adjusted to comprise the modified text. As another example, in case multiple clients made a same change to a location of a widget of a template, the template may be adjusted to comprise the modified location. In some cases, the digital adoption platform may deploy a manual feedback loop. For example, clients may manually request changes to templates.

In some cases, in addition to or instead of adjusting an existing template, clients that have access to the kit of templates may be provided with a suggestion or recommendation to replace a template with an adjusted template, and the template may be adjusted according to their response (confirming or declining). In some cases, a high number of declines of an adjustment, e.g., exceeding a threshold, may indicate that the adjustment should not be performed, that a previous version of the template and/or the kit should be restored, or the like.

In some cases, adjustments made to templates by a client may be stored in association with the client, and suggested or applied automatically for new selections of templates by the client (e.g., in case the same adjustments were made at least specified number of times by the client).

Referring now to FIGS. 3A-3J illustrating a utilization of an assistance layer template by a client device, in accordance with some exemplary embodiments of the disclosed subject matter.

Figure 3A:
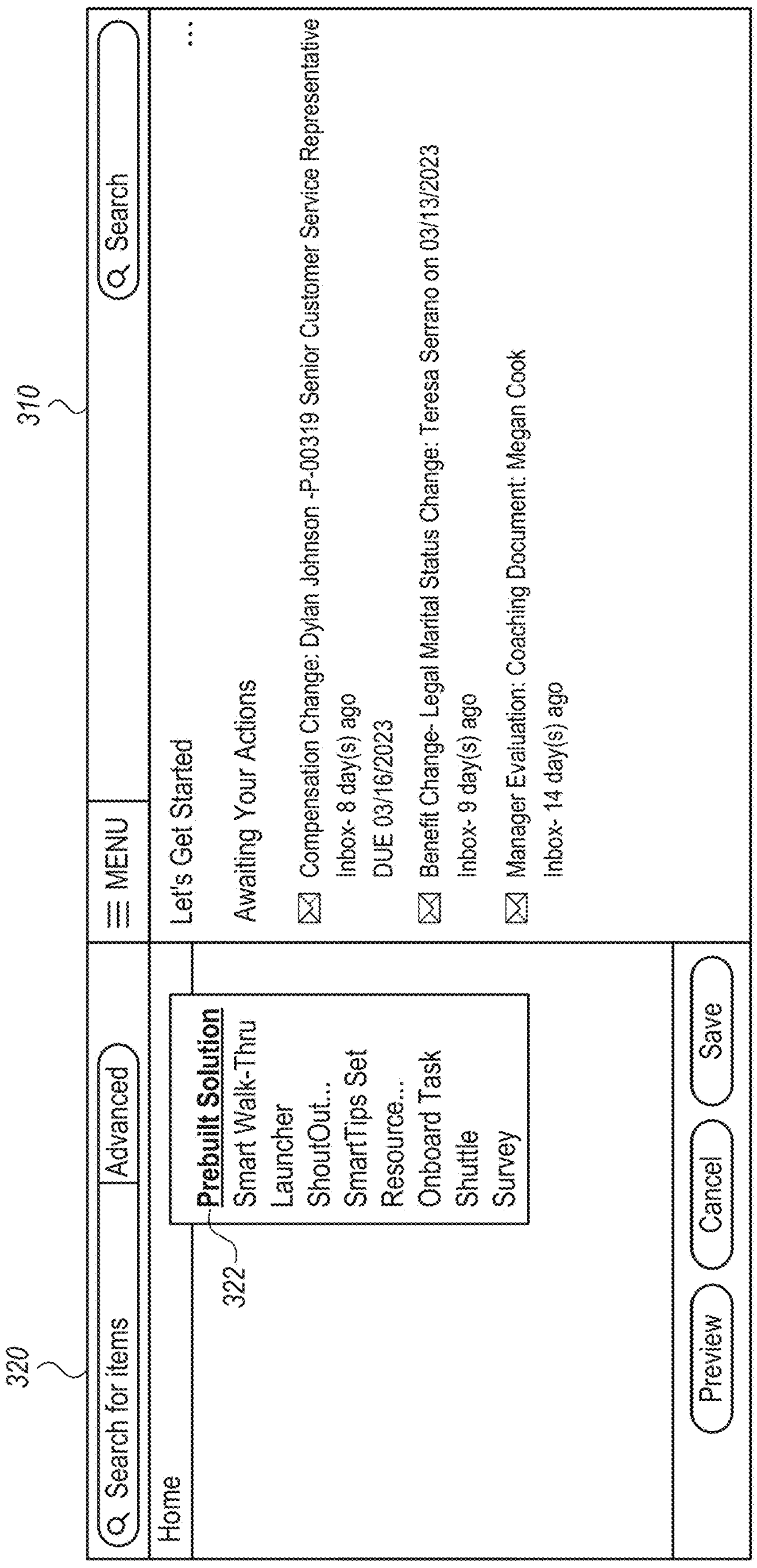
FIGS. 3A-3J illustrate an exemplary utilization of an assistance layer template, in accordance with some exemplary embodiments of the disclosed subject matter.

As depicted in FIG. 3A, an admin user associated with a client may render a page over which he desires to execute the assistance layer, e.g., Page 310. In some exemplary embodiments, Page 310 may correspond to Page 110 in FIGS. 1A-1D. In some exemplary embodiments, the assistance layer may be designed for aiding end-users to complete digital tasks, learn new features, overcome obstacles, or the like.

In some exemplary embodiments, in addition to rendering Page 310, the user may execute a digital adoption platform as a platform for generating the assistance layer over Page 310 and potentially one or more additional pages. In some exemplary embodiments, the digital adoption platform may render an editor, a digital adoption platform console, or the like, such as Editor 320, providing to the admin user digital adoption platform building blocks for designing the assistance layer. For example, Editor 320 may correspond to Editor 120 in FIGS. 1A-1D.

In some exemplary embodiments, in contrast to the scenario of FIGS. 1A-1E, in which no assistance layer templates were provided, Editor 320 may incorporate one or more kits of assistance layer templates. In some exemplary embodiments, Editor 320 may present to the builder, in addition to basic digital adoption platform building blocks such as launchers or walkthrough steps, an option of utilizing pre-built assistance layer templates. For example, Editor 320 may present a menu with Prebuilt Solutions 322 as a menu item, including a set of assistance layer templates.

Figure 3B:
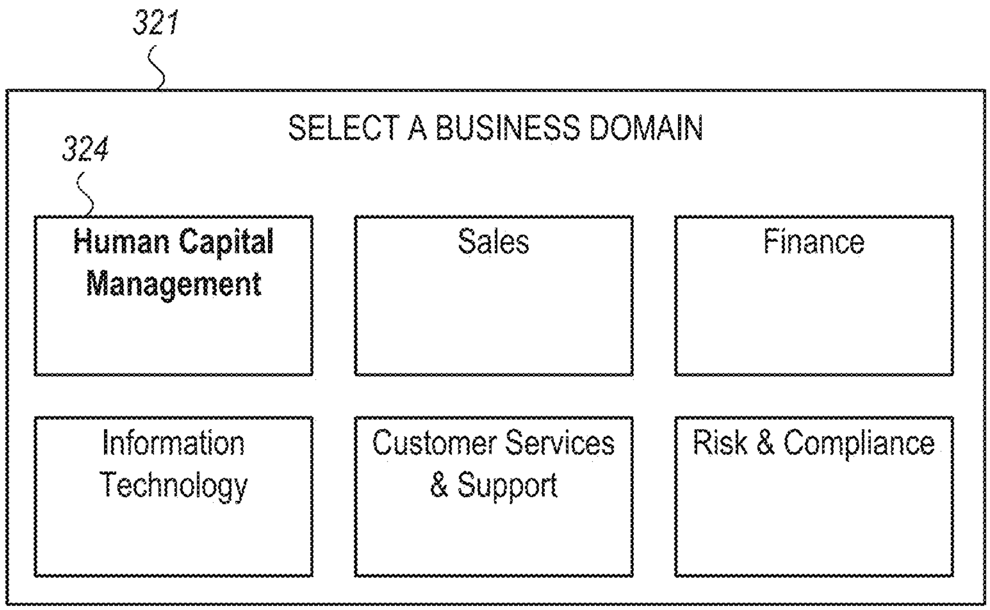

In some exemplary embodiments, upon selection of Prebuilt Solution 322, a set of a plurality of business domains may be presented to the user. For example, as depicted in FIG. 3B, the user may be presented with Business Domains 321, e.g., rendered by Editor 320. In some exemplary embodiments, the user may select one of the business domains of Business Domains 321. For example, the user may select Human Capital Management 324, in case the user desired to create an assistance layer for a digital process within the business domain of Human Capital Management 324.

Figure 3C:
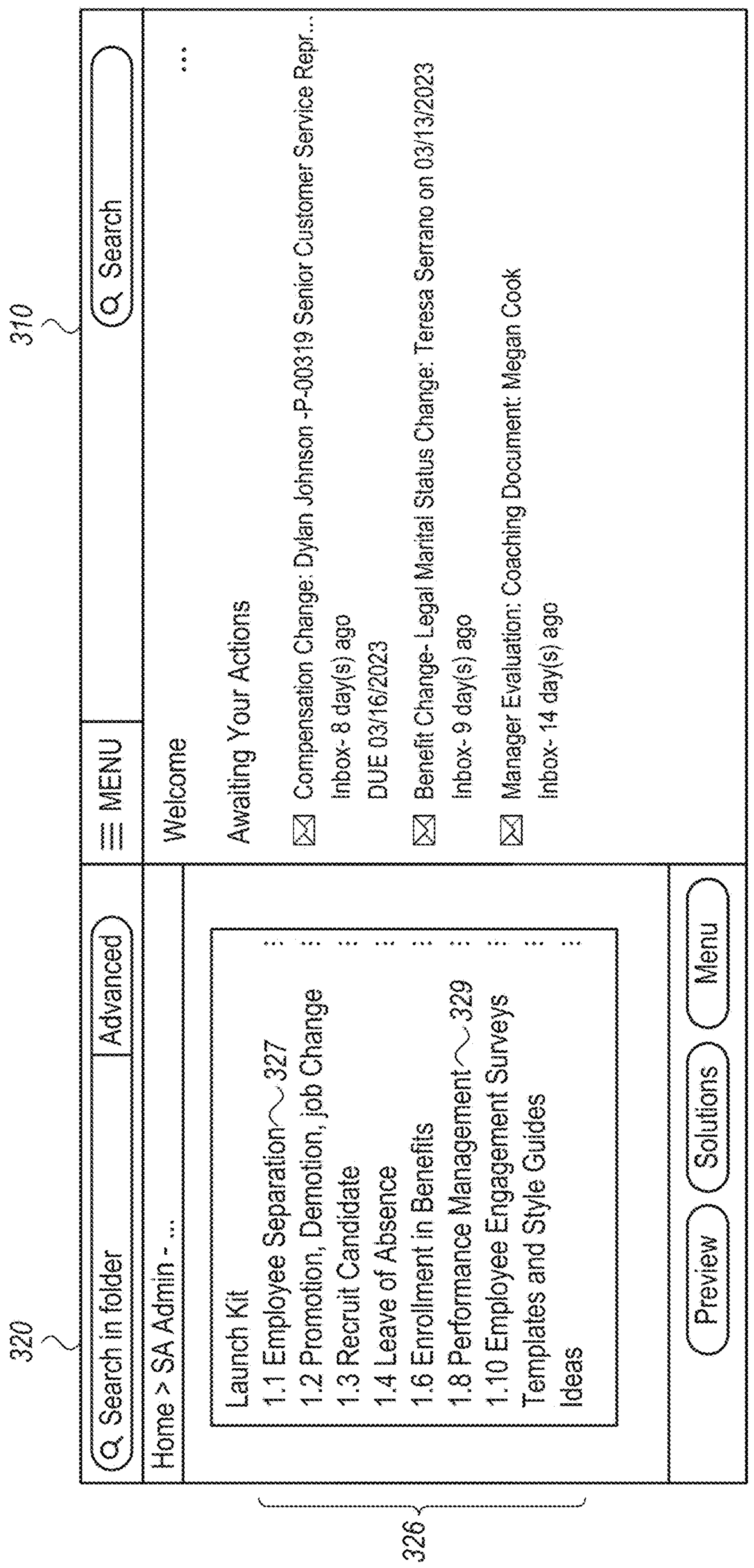
Figure 3E:
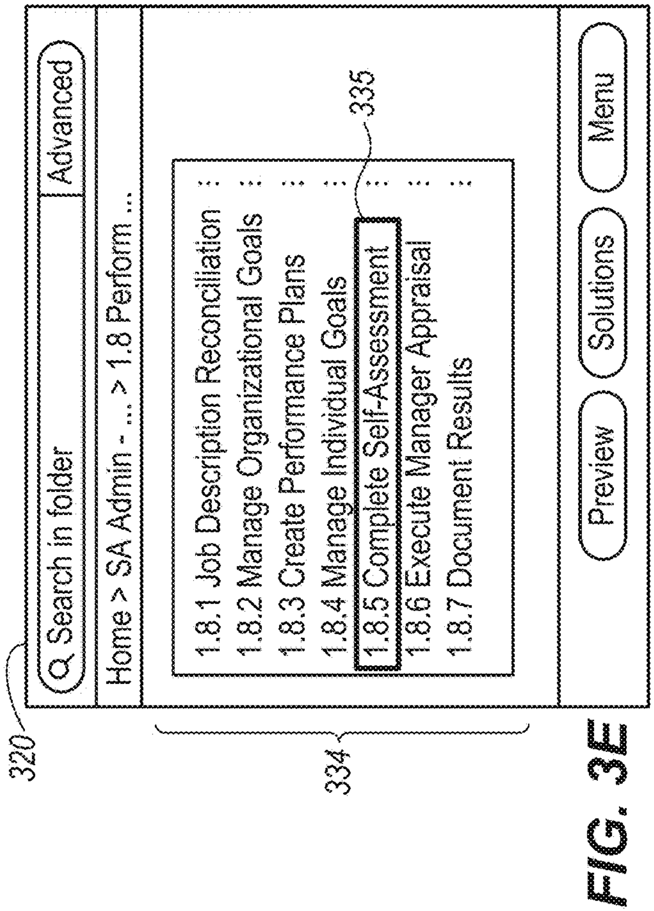

In some exemplary embodiments, upon selection of Human Capital Management 324, a set of a plurality of business processes within Human Capital Management 324 may be presented to the user. For example, as depicted in FIG. 3C, Editor 320 may present List 326, comprising a plurality of business processes. For example, List 326 may comprise business processes such as Employee Separation 327, Recruit Candidate, Leave of Absence, Performance Management 329, or the like, all of which constituting sub-categories of Human Capital Management 324. In some cases, these business processes may comprise cross-domain processes, single domain processes, or the like.

Figure 3F:
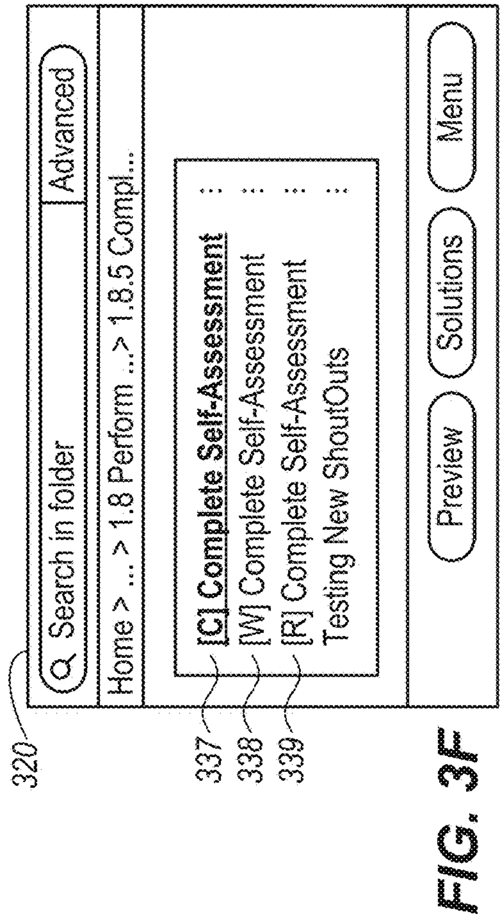
Figure 3D:
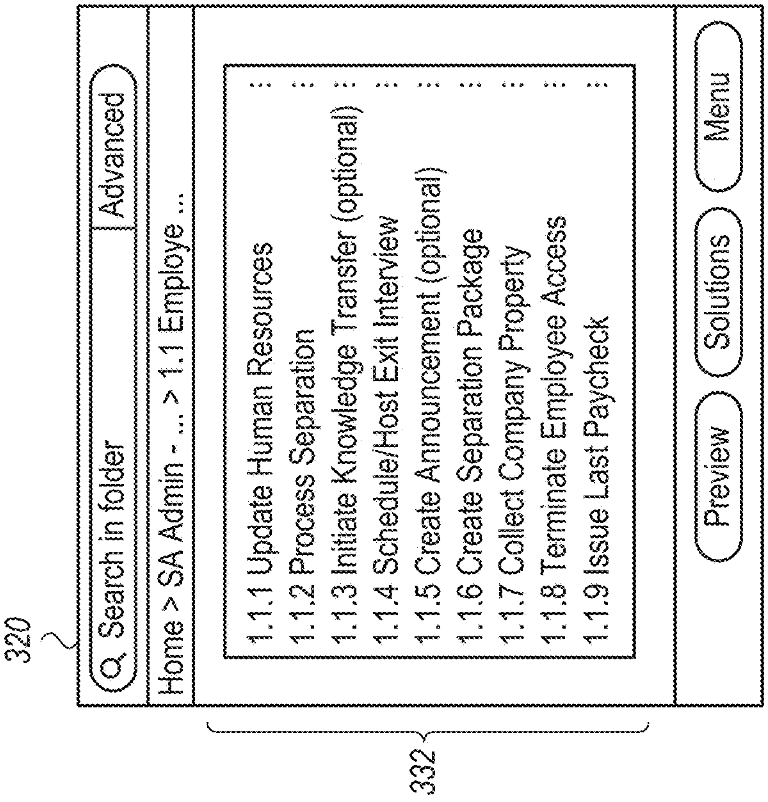

In some exemplary embodiments, upon selection of a business process such as Employee Separation 327, a list of a plurality of digital tasks implementing the business process or portions thereof may be presented to the user. For example, as depicted in FIG. 3D, Editor 320 may present List 332, comprising a plurality of digital tasks. For example, List 332 may comprise tasks such as Update Human Resources, Process Separation, Collect Company Property, or the like, all of which constituting sub-categories of Employee Separation 327.

Referring back to FIG. 3C, a different business process may be selected instead of Employee Separation 327. For example, Performance Management 329 may be selected by the admin user. In such a case, instead of presenting List 332, a different list of digital tasks may be presented by Editor 320, e.g., List 334 of FIG. 3E. For example, List 334 may comprise digital tasks such as Create Performance Plan, Manage Individual Goals, Complete Self-Assessment 335, Execute Manage Appraisal, or the like, all of which constituting sub-categories of Performance Management 329.

In some exemplary embodiments, it is noted that all the business domains, business processes, and digital tasks may be agnostic to the execution environment, to implementation details, or the like, as they may constitute abstract categories. In other cases, any other separation of processes into abstraction levels may be performed. For example, instead of the three abstraction levels from business domains to digital tasks, the processes may be classified to five abstraction levels from business domains to digital tasks, or to any other number of abstraction levels.

In some exemplary embodiments, the user may select a task from List 334, e.g., Complete Self-Assessment 335, or any other task. In some exemplary embodiments, selecting Complete Self-Assessment 335 may present to the user task accelerators (e.g., templates of assistance layers) that are configured to assist end users with implementing the task of Complete Self-Assessment 335 or portions thereof. For example, as depicted in FIG. 3F, different templates or task accelerator, all of which implementing an assistance layer for the task of Complete Self-Assessment 335, may be presented to the user. In some cases, the task accelerators may comprise cross-domain task accelerators, single domain task accelerators, or the like. In some exemplary embodiments, each task accelerator may constitute a template that is configured to be executed over a digital task within the selected business process. In some exemplary embodiments, task accelerators of Complete Self-Assessment 335 may be available as different types of an assistance layer, e.g., as a walkthrough, as a set of one or more tooltips, or the like.

In some exemplary embodiments, task accelerators available for the task of Complete Self-Assessment 335 may be available in different maturity levels. In some exemplary embodiments, different maturity levels may indicate the degree of complexity, in-depth definition and control over the task accelerator. For example, different maturity levels may involve varying quantities of items or components, and may demand varying degrees of effort to establish. For example, as depicted in FIG. 3F, task accelerators of Complete Self-Assessment 335 may be available in a minimal maturity level, e.g., Crawl Level 337, in a medium maturity level, e.g., Walk Level 338, or in a high maturity level, e.g., Run Level 339. In other cases, task accelerators may be classified into any other number of maturity clusters.

Figure 3G:
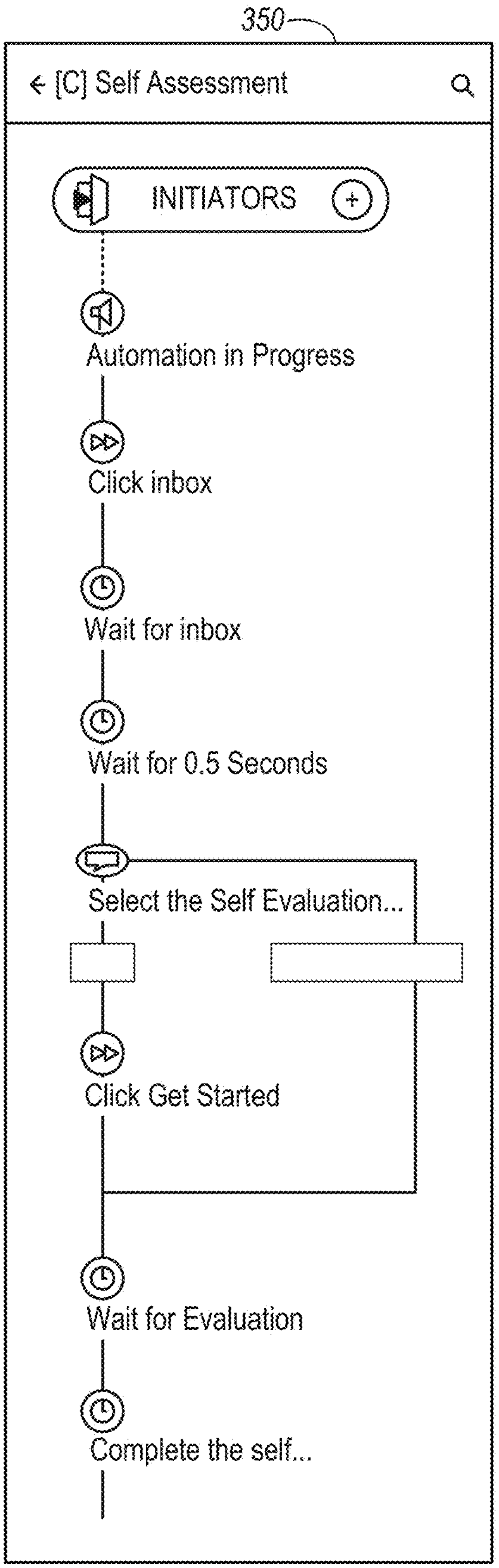

In some exemplary embodiments, a level of maturity of a task accelerator may refer to a level of complexity and in-detail implementation of the task accelerator. For example, as depicted in FIG. 3G, in response to selecting the task accelerator of Crawl Level 337, which has a lowest level of maturity, Walkthrough 350 may be generated as the assistance layer. Walkthrough 350 may defined an order sequence of simple walkthrough steps, such as presenting a tooltip widget with specified text, performing a waiting step for a defined timeframe, identifying a user interaction, or the like. In some cases, the task accelerator with the 'Crawl' level of maturity may incorporate basic features such as simple widgets, descriptive elements of walkthroughs, tooltips, launchers, permalinks, auto play widgets, or the like.

Figure 3H:
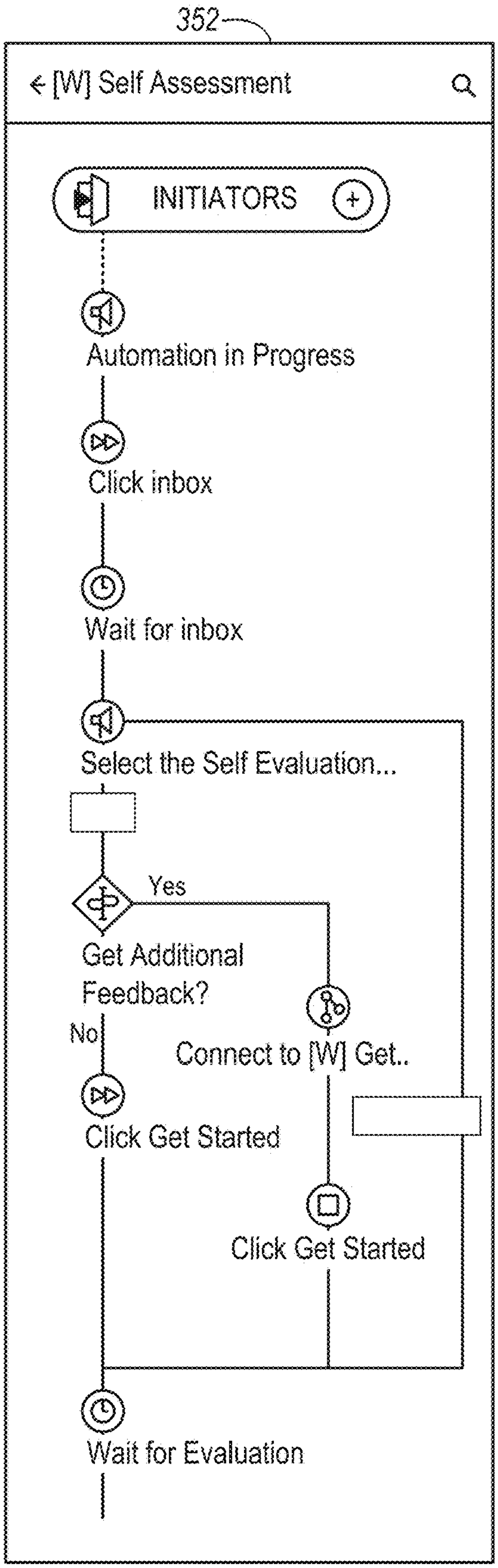

As another example, as depicted in FIG. 3H, in response to selecting a task accelerator with a different level of maturity of Complete Self-Assessment 335, e.g., Walk Level 338, Walkthrough 352 may be generated as the assistance layer. Walkthrough 352 may comprise all the steps, configurations and stages of Walkthrough 350, as well as additional steps and configurations. For example, in addition to the components of Walkthrough 350, Walkthrough 352 may comprise additional conditions and steps such as a conditional step of obtaining additional feedback from an end user, defining that in case additional feedback is provided, the process of Walkthrough 352 should connect to a digital adoption platform server, provide the additional input thereto, and present an additional widget for instructing the user to select a GUI control. In some cases, the 'Walk' level of maturity may incorporate the feature of the 'Crawl' level (e.g., simple widgets) along with additional sophisticated features such as in-depth automations, user segmentations, in-application automation, validation tooltips that can validate user inputs, or the like.

In some exemplary embodiments, each digital maturity level may comprise the previous components of the lower maturity level, along with additional components. For example, the 'Run' maturity level may comprise all the components of the 'Walk' level of maturity along with additional more sophisticated features. For example, the 'Run' maturity level may incorporate the feature of the 'Crawl' and 'Walk' levels along with more sophisticated features such as integrations with third-party systems, cross-application automations, features that rely on user segmentation, more sophisticated user segmentations, or the like.

In some exemplary embodiments, a task accelerator that is implemented in the 'Crawl' level of maturity may comprise a first assistance layer. In some exemplary embodiments, the same task accelerator that is implemented in the 'Walk' level of maturity may comprise a second assistance layer that comprises all of the components of the first assistance layer and additional components. In some exemplary embodiments, the same task accelerator that is implemented in the 'Run' maturity level may comprise a third assistance layer that comprises all of the components of the first and second assistance layers along with additional components. In other cases, a task accelerator that is implemented in different maturity levels may not incorporate all elements of lower maturity levels. For example, task accelerator that is implemented in the 'Run' maturity level may omit one or more components of lower maturity levels, replace one or more components of lower maturity levels with other components, or the like.

Figure 3I:
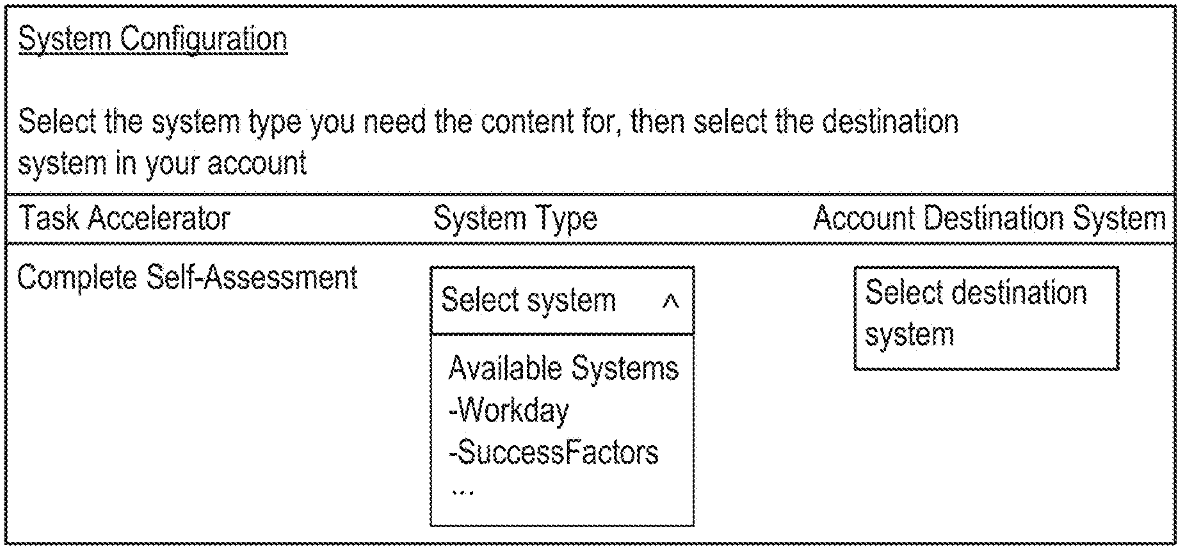
Figure 3J:
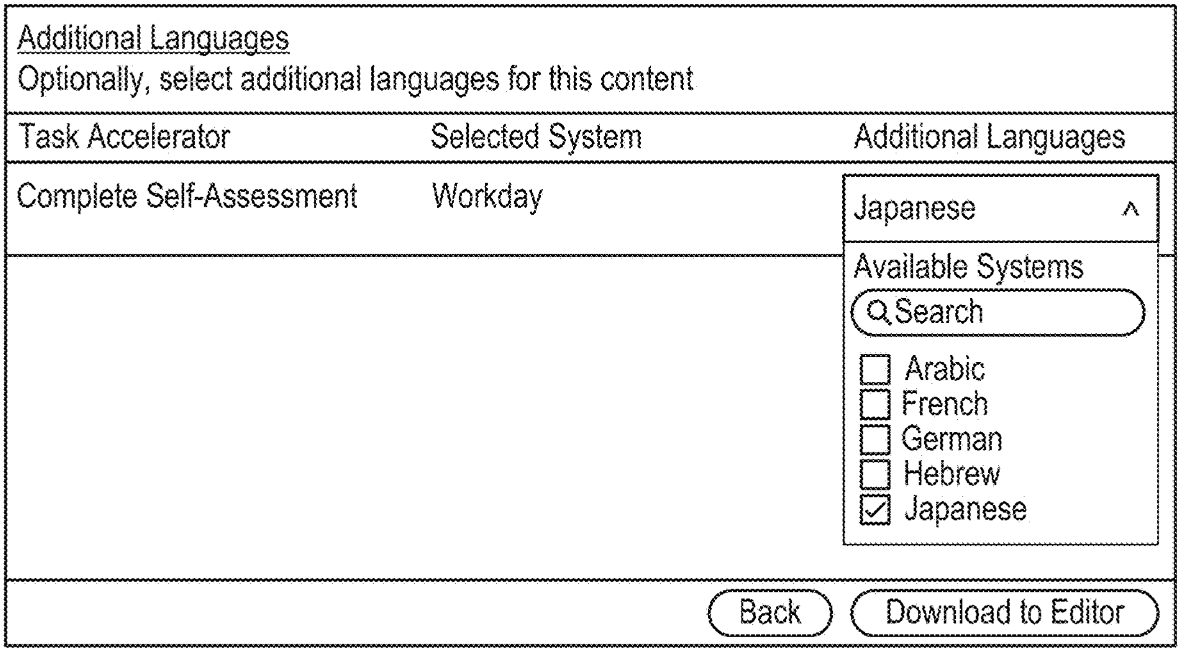

Referring back to FIG. 3F, after selecting a task accelerator with the desired maturity level for Complete Self-Assessment 335, one or more additional configurations of the task accelerator may be selected. For example, FIG. 3I depicts that at least one client application (e.g., denoted Workday™) over which the task accelerator should be executed may be selected, and FIG. 3J depicts that a language of the task accelerator may be selected.

In some exemplary embodiments, after the task accelerator is selected and configured by the client, the client may or may not perform one or more edits to the assistance layer implemented by the task accelerator, and deploy the assistance layer over client applications, e.g., according to Steps 240-250 of FIG. 2A.

Figure 4A:
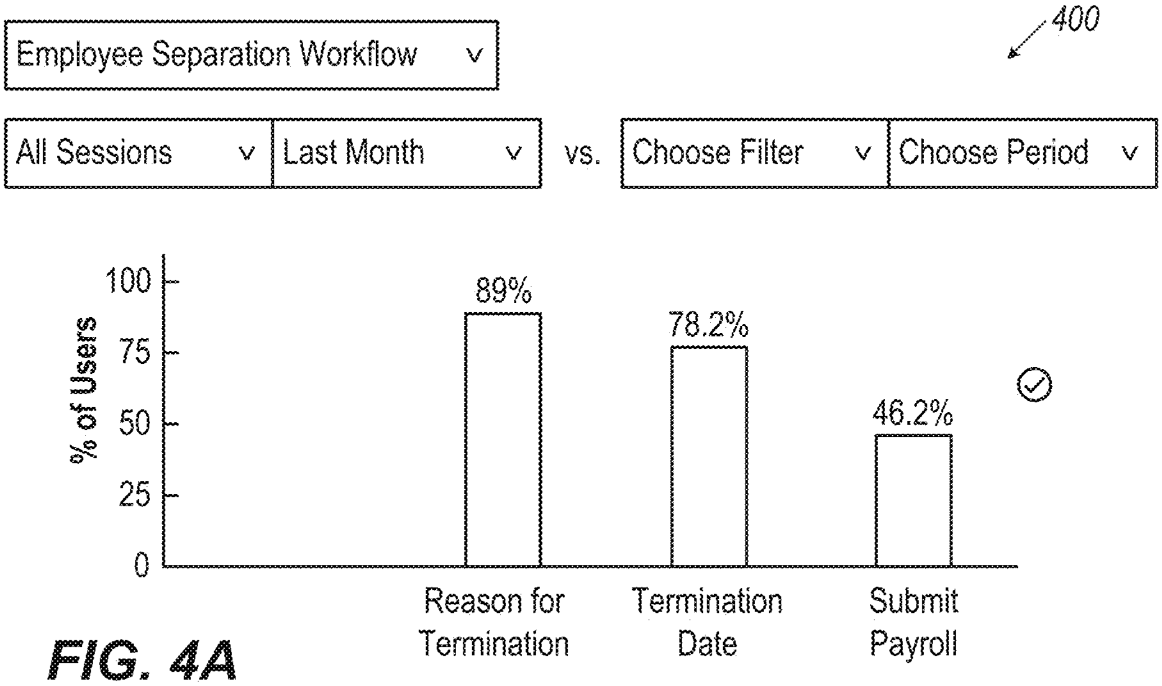
FIGS. 4A-4B depict exemplary bar charts, in accordance with some exemplary embodiments of the disclosed subject matter.
Figure 4B:
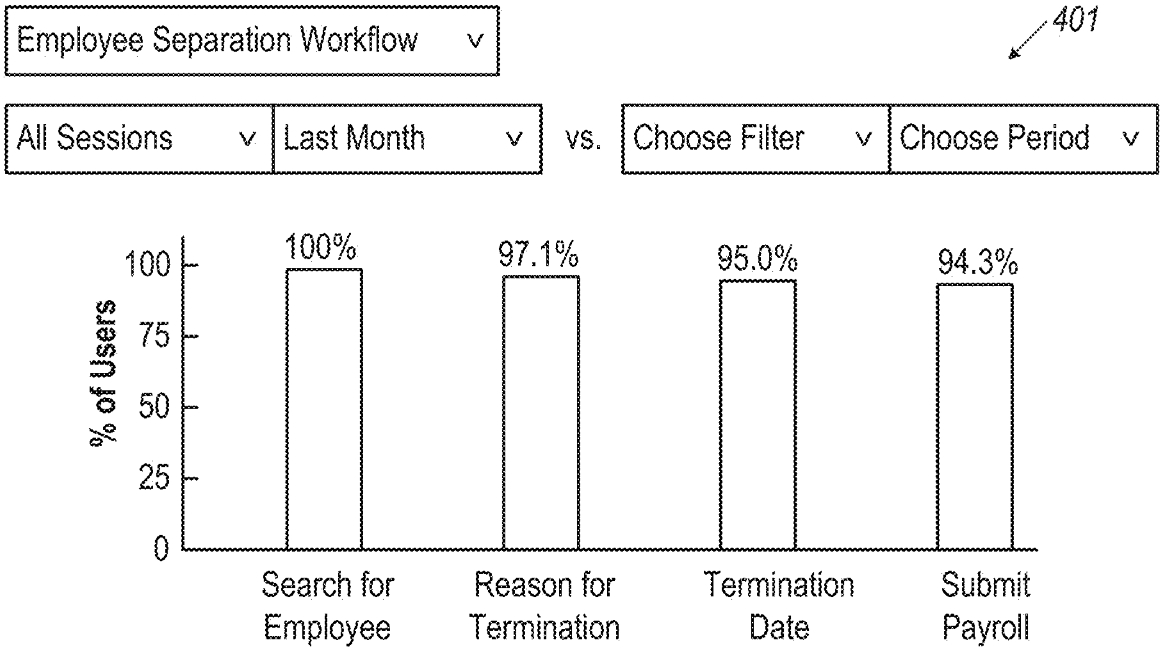

Referring now to FIGS. 4A-4B showing exemplary bar charts, in accordance with some exemplary embodiments of the disclosed subject matter.

In some exemplary embodiments, usage analytics, benchmark data, statistical data, or the like, of digital journeys of end users may be measured, determined, or the like, e.g., at a backend of a digital adoption platform. For example, the benchmark data may be determined based on BI data, such as the BI data accumulated on Step 215 of FIG. 2B, and presented to clients. In some exemplary embodiments, for each client, analytics data of their respective customers may be collected. For example, analytics data may indicate engagement rates of end users with templates, a number of end users served by a template or by an assistance layer based thereon, process improvement rates, resolution rates of a digital task, average speed of performing the digital task by end users, or the like. In some exemplary embodiments, the analytics data may be presented to clients using the digital adoption platform, such as via a visualization tool.

In some exemplary embodiments, benchmark data may be generated per business domain, business process, task, or per any other abstraction level of digital journeys. For example, Bar Charts 400 and 401, depicted in FIGS. 4A-4B, represent statistical data gathered regarding tasks of the business process: 'Employee Separation'. For example, the digital tasks within the Employee Separation process may comprise 'Reason For Termination', 'Termination Date', and 'Submit Payroll'.

In some exemplary embodiments, Bar Chart 400 depicts, for a client, the percentage of end users associated with the client that managed to fully complete each digital tasks of the Employee Separation business process. For example, the percentage may be based on a selected timeframe (e.g., a last month), one or more filters selected by the client, or the like. In some cases, the bar chart may enable clients to display a comparison between analytics of different periods, different filters, or the like. For example, a client may be presented with a comparison between completion rates of tasks over time. In some exemplary embodiments, Bar Chart 400 may present an average time for completion of each of the tasks of Employee Separation, a total average time for completion based on all the tasks, an overall success rate of all the tasks, or the like.

In some exemplary embodiments, while Bar Chart 400 relates to completion rates of clients before templates of assistance layers were provided to the client, Bar Chart 401 depicts changes that occurred in completion rates of the same tasks, after the templates of assistance layers were provided and utilized by the client. For example, as depicted in FIG. 4B, based on data accumulated from 6,778 end users of the client, the completion rate of the 'Submit Payroll' task was increased from 46.2% to 94.3% after deploying the templates, thereby showing a significant effectiveness of the templates.

In some exemplary embodiments, as depicted in FIG. 4B, one or more tasks that did not have assistance layers before may be identified, and templates may be generated therefore, such as based on Sub-Step 234 of FIG. 2B. For example, a 'Search For Employee' task may be automatically identified within the digital adoption platform and a template may be generated therefore. In some cases, for a newly identified template, a client may be presented with a comparison between completion rates of tasks over different timeframes that are subsequent to the deployment of the template.

In some exemplary embodiments, benchmark data may be generated to present statistical differences in completion rates of digital tasks for different maturity levels (not depicted). For example, the benchmark data may depict a difference in failures with completing a digital task when the client used templates with the 'Crawl' level of maturity, and when the client used templates with the 'Walk' level of maturity. As another example, the benchmark data may depict a difference in the average time it took end users to complete a digital task when the client used templates with the 'Walk' level of maturity, and when the client used templates with the 'Run' level of maturity. According to these examples, clients may be enabled to perform informed decisions regarding usage of templates in different maturity levels, based on the benchmark data. For example, in case templates with higher maturity levels (or assistance layers based thereon) were found to be significantly more effective than templates with lower maturity levels (or assistance layers based thereon), a client may be advised to mature their assistance layers accordingly.

In some exemplary embodiments, benchmark data may be generated to present levels of maturity of deployed templates, e.g., to admin users of the digital adoption platform, to admin users of a specific client, or the like. For example, admins of the digital adoption platform may be informed that 30% of the digital adoption platform templates utilized globally by all clients correspond to the 'Crawl' level of maturity, 50% of the digital adoption platform templates utilized by clients correspond to the 'Walk' level of maturity, and 20% of the digital adoption platform templates utilized by clients correspond to the 'Run' level of maturity. According to this example, the admins may be enabled to track how the templates mature over all clients, how this affects their efficiency, or the like. As another example, similar statistics regarding digital adoption platform templates utilized by a specific client may be presented to admin users of the client.

In other cases, clients may be presented with any other reports, charts, heatmaps, flow diagrams, A/B testing, or the like. For example, clients may be presented with statistics metrics such as challenges or failures encountered in digital tasks or business processes, challenges addressed by each template, benchmarks for each template, portions of digital tasks where users were stuck, or the like. For example, a UII feature may be embedded in pages of client applications and may report that 10% of the attempts to fill in a form field failed, may provide details regarding the types of failures that were encountered, or the like. In some exemplary embodiments, defined touchpoints of digital tasks may be tagged, using digital adoption platform building blocks or templates, to automatically collect data regarding user interactions with the touchpoints. In some exemplary embodiments, this may enable an automatic generation of heatmaps, flow diagrams, or the like, that display areas of difficulty for end users, inter-team connectivity, or the like. In some exemplary embodiments, the report may be presented visually, textually, via audio, or the like.

In some exemplary embodiments, based on the benchmark data of a business process, clients may measure adoption levels of their business processes, measure the effectiveness of templates, the effectiveness of assistance layers, obtain insights, perform an informed adjustment of assistance layers, or the like. In some exemplary embodiments, in addition to visualizing the analytics data, the data may be used automatically for the automatic feedback loop of FIGS. 2A-2B.

Figure 5:
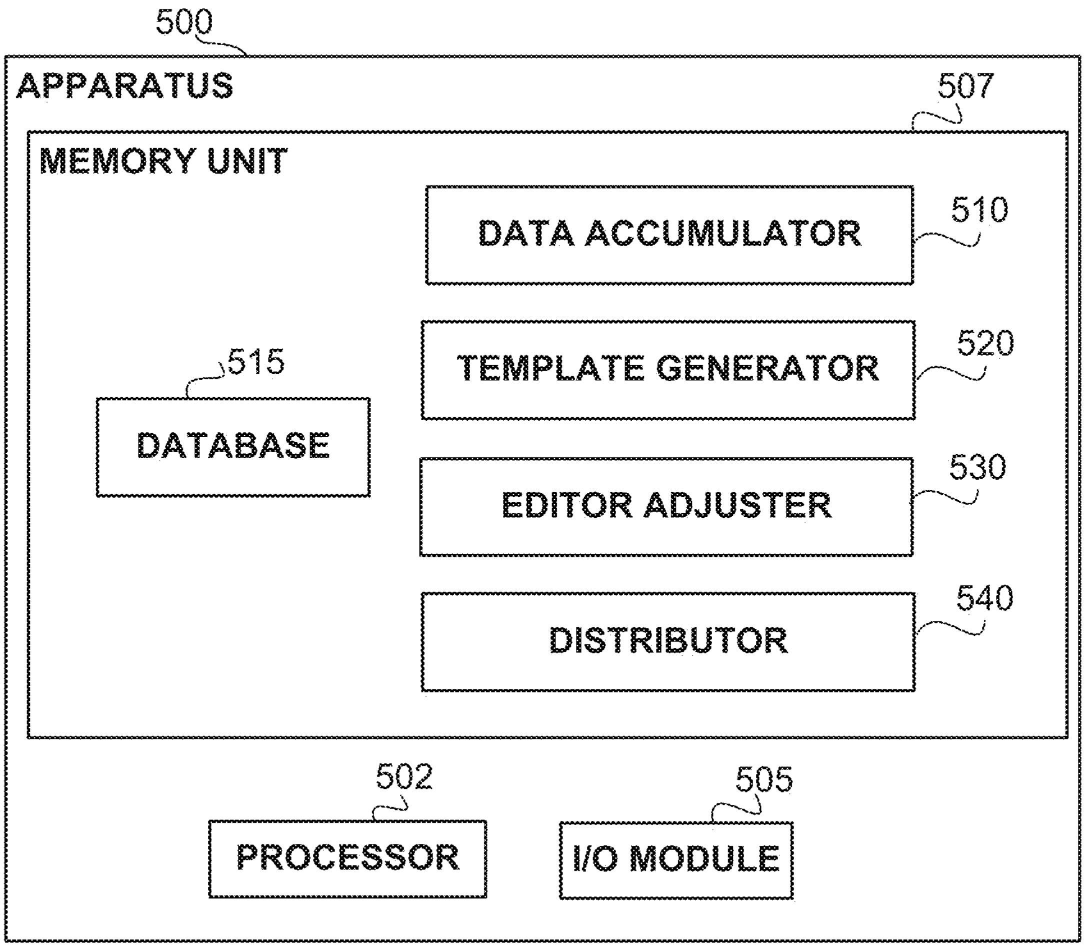
FIG. 5 shows a block diagram of an apparatus, in accordance with some exemplary embodiments of the disclosed subject matter.

Referring now to FIG. 5 showing a block diagram of an apparatus, in accordance with some exemplary embodiments of the disclosed subject matter.

In some exemplary embodiments, an Apparatus 500 may comprise a Processor 502. Processor 502 may be a Central Processing Unit (CPU), a microprocessor, an electronic circuit, an Integrated Circuit (IC) or the like. Processor 502 may be utilized to perform computations required by Apparatus 500 or any of its subcomponents. Processor 502 may be configured to execute computer-programs useful in performing the methods of FIGS. 2A-2B, or the like. In some exemplary embodiments, Apparatus 500 may comprise a central processing unit associated with a digital adoption platform.

In some exemplary embodiments of the disclosed subject matter, an Input/Output (I/O) Module 505 may be utilized to provide an output to and receive input from a user such as an operator, an automation program, or the like. I/O Module 505 may be used to transmit and receive information to and from the user or any other apparatus, e.g., client devices, end devices, a server, or the like, in communication therewith.

In some exemplary embodiments, Apparatus 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 502 to perform acts associated with any of the subcomponents of Apparatus 500. In some exemplary embodiments, Memory Unit 507 may retain program code operative to cause Processor 502 to perform acts associated with any of the steps in FIGS. 2A-2B, or the like.

In some exemplary embodiments, Memory Unit 507 may comprise one or more datasets, databases, repositories, or the like, such as Database 515.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

In some exemplary embodiments, Memory Unit 507 may comprise Data Accumulator 510. Data Accumulator 510 may be configured to crowdsource data from a plurality of end devices, client devices of clients of the digital adoption platform, or the like, e.g., similarly to Step 215 of FIG. 2B. For example, Data Accumulator 510 may obtain a plurality of assistance layers that are deployed by the clients to be augmented over digital tasks, and store them in Database 515. As another example, Data Accumulator 510 may obtain a plurality of digital journeys (e.g., implementing the digital tasks) of end devices, and store them in Database 515. In some exemplary embodiments, the assistance layers may be generated and deployed by clients and may be executable by end devices over client applications of the clients. In some exemplary embodiments, the assistance layers may be intended to assist end users of the end devices with performing the digital tasks over the client applications.

In some exemplary embodiments, Memory Unit 507 may comprise a Template Generator 520. In some exemplary embodiments, Template Generator 520 may be configured to generate a plurality of template assistance layers configured to assist clients of the digital adoption platform with generating new assistance layers for digital tasks. For example, Template Generator 520 may generate template assistance layers based on one or more techniques such as clustering techniques, data analysis tools, abstraction techniques, machine learning algorithms, classifiers, or the like. In some exemplary embodiments, the new assistance layers may be intended to assist the end users with performing the digital tasks, and may be generated based on the assistance layers accumulated by Data Accumulator 510, a grouping framework defining digital task categories, or the like. For example, assistance layers may be grouped into respective digital task categories, business process categories, and process domain categories, or into any other categories, such as by one or more business process mining tools, and the grouping may be useful for clustering or binning together assistance layers associated with a same category (digital task).

In some exemplary embodiments, Template Generator 520 may be configured to generate templates in one or more maturity levels. For example, a first template assistance layer for a digital task may be defined in a first maturity level, and a second template assistance layer for the same digital task may be defined in a second maturity level. According to this example, the first template assistance layer may comprise less digital adoption platform building components than the second template assistance layer, e.g., as the first template assistance layer may be less digitally mature. In some cases, all digital adoption platform building components of the first template assistance layer may be comprised within the second template assistance layer. In some exemplary embodiments, the first and second maturity levels may differ in a complexity of the digital adoption platform building components utilized thereby. For example, assistance layers in the first maturity level may be less complex.

In some exemplary embodiments, Template Generator 520 may be configured to generate adjustments to existing templates, such as in response to identifying that clients made many changes to previously provided templates, that clients did not use previously provided templates, or the like.

In some exemplary embodiments, Memory Unit 507 may comprise an Editor Adjustor 530, configured to adjust an editor of the digital adoption platform to comprise the template assistance layers generated and/or adjusted by Template Generator 520. In some exemplary embodiments, an adjusted editor of the digital adoption platform may enable clients of the digital adoption platform to define, on their client devices, assistance layers via the editor. For example, the assistance layers may be defined by utilizing at least a portion of the template assistance layers served by the editor.

In some exemplary embodiments, Memory Unit 507 may comprise a Distributor 540, which may be configured to distribute the adjusted editor, such as the editor with the new templates as adjusted by Editor Adjustor 530, to clients of the digital adoption platform that deploy digital adoption platforms with editors. For example, the editor adjustments may be distributed to the clients via version control systems, through software distribution platforms, through APIs or web services that clients can integrate into their existing digital adoption platform, through container registries, by manual installation, or the like.

In some exemplary embodiments, Data Accumulator 510 may continuously or periodically crowdsource additional data, and dynamically adjust Database 515 to include newly accumulated data, e.g., new assistance layers deployed over the digital tasks. In some exemplary embodiments, the new assistance layers may be processed by Template Generator 520 to generate one or more new template assistance layers excluded from the previously generated template assistance layers, to adjust previously generated template assistance layers, or the like. In some exemplary embodiments, the editor may be adjusted accordingly by Editor Adjustor 530 and distributed by Distributor 540.

In some exemplary embodiments, statistical data regarding executions of assistance layers and/or digital tasks before and after the adjustment of the editor may be accumulated, by Data Accumulator 510, and used to estimate an effect of providing the new template assistance layers, on the executions of the digital tasks. In some exemplary embodiments, statistical data regarding executions of template assistance layers in different maturity levels may be accumulated, e.g., by Data Accumulator 510, and used to estimate an effect of a maturity level on the executions of the digital task based. In other cases, any other benchmark data may be determined and presented. In some exemplary embodiments, statistical data regarding the performance of templates that are deployed by a specific client, may be presented to the same client.

In some exemplary embodiments, a client of the digital adoption platform may receive from Distributor 540 the adjusted editor with the templates of assistance layers (or only the templates), and utilize the digital adoption platform to generate an assistance layer. The digital adoption platform with the templates may be configured to assist an administrator user of the client with generating an assistance layer over a digital task of a business process of the client, the business process belonging to a business domain.

In some exemplary embodiments, in order to generate the assistance layer over the digital task, the editor of the digital adoption platform may present to the user, via a user interface, a list of business domains. In some exemplary embodiments, the user may be enabled to select, via the user interface of the editor, the business domain of the desired digital task. In some exemplary embodiments, in response to the user selection, the editor may present a list of business processes within the business domain. In some exemplary embodiments, the user may be enabled to select, via the user interface of the editor, the business process of the desired digital task. In some exemplary embodiments, in response to the user selection, the editor may present a list of a plurality of digital tasks within the business process. In some exemplary embodiments, the user may be enabled to select, via the user interface of the editor, the desired digital task. In some exemplary embodiments, each of the presented digital tasks may implement at least in part the selected business process. In some exemplary embodiments, the business domains, business processes, and digital tasks may all be agnostic to an execution environment of the digital task.

In some exemplary embodiments, in response to the user selection of the digital task, the editor may present a list of a plurality of templates of assistance layers for the digital task, e.g., in different maturity levels, different types of assistance layers, or the like. In some exemplary embodiments, the user may be enabled to select, via the user interface of the editor, a template configured to be executed over the desired digital task. In some exemplary embodiments, although the business processes, the business domains, and digital tasks presented by the editor may all be agnostic to the environment of the digital task, the selected template may be environment-specific and may implement the assistance layer for the digital task in a specific way over a specified environment. For example, the environment may comprise the client applications (e.g., two or more applications for a cross-domain task) over which the digital task is configured to be performed, a language for the assistance layer, a language of the client applications, or the like. In other cases, a single assistance layer may be executable over multiple client applications.

In some exemplary embodiments, the user may or may not edit the template, such as according to configurations of the environment of the digital task. In some exemplary embodiments, after selecting and/or editing the template, the template may be distributed or provided to a plurality of end devices, thereby enabling the end devices to execute the template over the environment of the digital task.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method to be implemented at a central processing unit associated with a digital adoption platform, the method comprising:

obtaining a plurality of assistance lavers that are configured to be augmented over digital tasks, wherein the digital tasks are executable by end devices over client applications, wherein the plurality of assistance lavers is configured to assist end users of the end devices with performing the digital tasks over the client applications;

grouping the plurality of assistance layers into respective digital task categories, business process categories, and process domain categories, wherein the digital task categories, business process categories, and process domain categories are technology-agnostic and not associated with the client applications, wherein said grouping the plurality of assistance layers is performed based on one or more business process mining tools;

generating, based on the plurality of assistance lavers a plurality of template assistance lavers, the plurality of template assistance layers are configured to assist clients of the digital adoption platform with generating new assistance layers, wherein the new assistance layers are intended to assist the end users with performing the digital tasks:

adjusting an editor of the digital adoption platform to comprise the plurality of template assistance layers, thereby obtaining an adjusted editor; and distributing the adjusted editor to the clients.

2. The method of claim 1 further comprising:

subsequently to said obtaining, accumulating new assistance layers deployed over the digital tasks;

generating, based on the new assistance layers, a new template assistance layer that is excluded from the plurality of template assistance layers; and dynamically adjusting the editor to comprise the new template assistance layer.

3. The method of claim 1 further comprising:

subsequently to said obtaining, accumulating new assistance layers deployed over the digital tasks;

dynamically adjusting, based on the new assistance layers, a template assistance layer from the plurality of template assistance layers, thereby obtaining an adjusted template assistance layer; and dynamically adjusting the editor to comprise the adjusted template assistance layer.

4. The method of claim 1, wherein the plurality of assistance layers is defined via the editor of the digital adoption platform by the clients of the digital adoption platform.

5. The method of claim 1 further comprising enabling the clients of the digital adoption platform to edit the plurality of template assistance layers via client devices.

6. The method of claim 1 further comprising accumulating statistical data regarding executions of the digital tasks over the end devices before and after said adjusting, and determining, based on the statistical data, an effect of said adjusting on the executions of the digital tasks.

7. The method of claim 1, wherein said obtaining the plurality of assistance layers comprises obtaining data from at least one of: the end devices, and client devices of the clients of the digital adoption platform.

8. The method of claim 1 further comprising storing the plurality of assistance layers in a dataset, and periodically adjusting the dataset based on new crowdsourced data from said obtaining.

9. The method of claim 1, wherein said generating the plurality of template assistance layers is performed based on one or more techniques selected from: clustering techniques, data analysis tools, abstraction techniques, and machine learning algorithms.

10. A method to be implemented at a central processing unit associated with a digital adoption platform, the method comprising:

obtaining a plurality of assistance layers that are configured to be augmented over digital tasks, wherein the digital tasks are executable by end devices over client applications, wherein the plurality of assistance layers is configured to assist end users of the end devices with performing the digital tasks over the client applications;

generating based on the plurality of assistance lavers, a plurality of template assistance lavers, the plurality of template assistance layers are configured to assist clients of the digital adoption platform with generating new assistance layers, wherein the new assistance layers are intended to assist the end users with performing the digital tasks;

adjusting an editor of the digital adoption platform to comprise the plurality of template assistance layers, thereby obtaining an adjusted editor; and distributing the adjusted editor to the clients, wherein the plurality of assistance lavers is defined via the editor of the digital adoption platform by the clients of the digital adoption platform, wherein at least a portion of the plurality of assistance layers is generated by the clients of the digital adoption platform without utilizing any previous template assistance layer available at the editor.

11. The method of claim 10 further comprising grouping the plurality of assistance layers into respective digital task categories, business process categories, and process domain categories, wherein the digital task categories, business process categories, and process domain categories are technology-agnostic and not associated with the client applications.

12. A method to be implemented at a central processing unit associated with a digital adoption platform, the method comprising:

obtaining a plurality of assistance layers that are configured to be augmented over digital tasks, wherein the digital tasks are executable by end devices over client applications, wherein the plurality of assistance layers is configured to assist end users of the end devices with performing the digital tasks over the client applications;

generating, based on the plurality of assistance lavers, a plurality of template assistance lavers, the plurality of template assistance layers are configured to assist clients of the digital adoption platform with generating new assistance layers, wherein the new assistance layers are intended to assist the end users with performing the digital tasks;

adjusting an editor of the digital adoption platform to comprise the plurality of template assistance layers, thereby obtaining an adjusted editor; and distributing the adjusted editor to the clients, wherein the plurality of assistance layers is defined via the editor of the digital adoption platform by the clients of the digital adoption platform, wherein at least a portion of the plurality of assistance layers is generated by the clients of the digital adoption platform based on a previous template assistance layer that was available at the editor before said distributing.

13. A method to be implemented at a central processing unit associated with a digital adoption platform, the method comprising:

obtaining a plurality of assistance layers that are configured to be augmented over digital tasks, wherein the digital tasks are executable by end devices over client applications, wherein the plurality of assistance layers is configured to assist end users of the end devices with performing the digital tasks over the client applications;

generating, based on the plurality of assistance lavers, a plurality of template assistance layers, the plurality of template assistance layers are configured to assist clients of the digital adoption platform with generating new assistance layers, wherein the new assistance layers are intended to assist the end users with performing the digital tasks, wherein said generating comprises generating, for a digital task, a first template assistance layer in a first maturity level, and a second template assistance layer in a second maturity level, wherein the first and second template assistance layers are configured to assist the end users with performing the digital task, wherein the first template assistance layer comprises less digital adoption platform building components than the second template assistance layer;

adjusting an editor of the digital adoption platform to comprise the plurality of template assistance layers, thereby obtaining an adjusted editor; and distributing the adjusted editor to the clients.

14. The method of claim 13, wherein all digital adoption platform building components of the first template assistance layer are comprised within the second template assistance layer.

15. The method of claim 13 further comprising accumulating statistical data regarding executions of the digital tasks together with the first and second template assistance layers, and determining, based on the statistical data, an effect of a maturity level on the executions of the digital task.

16. An apparatus comprising a processor and coupled memory, the processor associated with a digital adoption platform, said processor being adapted to perform:

obtaining a plurality of assistance layers that are configured to be augmented over digital tasks, wherein the digital tasks are executable by end devices over client applications, wherein the plurality of assistance layers is configured to assist end users of the end devices with performing the digital tasks over the client applications;

generating, based on the plurality of assistance layers, a plurality of template assistance layers, the plurality of template assistance layers are configured to assist clients of the digital adoption platform with generating new assistance layers, wherein the new assistance layers are intended to assist the end users with performing the digital tasks;

adjusting an editor of the digital adoption platform to comprise the plurality of template assistance layers, thereby obtaining an adjusted editor; and distributing the adjusted editor to the clients, wherein the plurality of assistance layers is defined via the editor of the digital adoption platform by the clients of the digital adoption platform, wherein at least a portion of the plurality of assistance layers is generated by the clients of the digital adoption platform without utilizing any previous template assistance layer available at the editor.

17. The apparatus of claim 16, wherein the processor is further adapted to perform:

subsequently to said obtaining, accumulating new assistance layers deployed over the digital tasks;

generating, based on the new assistance layers, a new template assistance layer that is excluded from the plurality of template assistance layers; and dynamically adjusting the editor to comprise the new template assistance layer.

* * * * *